United States Patent
Hayden et al.

(10) Patent No.: US 8,433,685 B2
(45) Date of Patent: Apr. 30, 2013

(54) METHOD AND SYSTEM FOR PARITY-PAGE DISTRIBUTION AMONG NODES OF A MULTI-NODE DATA-STORAGE SYSTEM

(75) Inventors: Mark G. Hayden, Gardnerville, NV (US); Lawrence Michael Ruane, Parker, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 118 days.

(21) Appl. No.: 12/859,130

(22) Filed: Aug. 18, 2010

(65) Prior Publication Data
US 2012/0047111 A1 Feb. 23, 2012

(51) Int. Cl.
*G06F 17/00* (2006.01)

(52) U.S. Cl.
USPC ............... 707/649; 707/640; 711/161

(58) Field of Classification Search .................. None
See application file for complete search history.

(56) References Cited

U.S. PATENT DOCUMENTS

| | | | |
|---|---|---|---|
| 4,761,785 A * | 8/1988 | Clark et al. ................ | 714/805 |
| 6,766,491 B2 | 7/2004 | Busser | |
| 7,313,724 B1 | 12/2007 | Kekre et al. | |
| 7,457,980 B2 | 11/2008 | Yang et al. | |
| 7,631,155 B1 | 12/2009 | Bono et al. | |
| 7,970,996 B1 * | 6/2011 | Corbett ........................ | 711/114 |
| 7,979,771 B2 * | 7/2011 | Margolus et al. ............ | 714/752 |
| 2002/0059539 A1 * | 5/2002 | Anderson ..................... | 714/6 |
| 2003/0135514 A1 * | 7/2003 | Patel et al. ................... | 707/102 |
| 2008/0115017 A1 * | 5/2008 | Jacobson ..................... | 714/710 |
| 2008/0126842 A1 * | 5/2008 | Jacobson et al. ............ | 714/6 |
| 2010/0115335 A1 * | 5/2010 | Wylie et al. ................. | 714/25 |
| 2010/0235413 A1 * | 9/2010 | Patel et al. ................... | 707/825 |
| 2010/0257219 A1 * | 10/2010 | Patel et al. ................... | 707/827 |
| 2011/0154168 A1 * | 6/2011 | Lee et al. ..................... | 714/801 |

(Continued)

FOREIGN PATENT DOCUMENTS

JP 2001142653 5/2001

OTHER PUBLICATIONS

James Lee Hafner, "Weaver Codes: Highly Fault Tolerant Erasure Codes for Storage Systems", 4th USENIX Conference on File and Storage Technologies, 2005.*

(Continued)

*Primary Examiner* — Hung Le

(57) ABSTRACT

One embodiment of the present invention is directed to a multi-node data-storage system comprising a number C of component-data-storage-system nodes that store data pages of a data object in a mirror and in 0, 1, or more parity-encoded snapshots, the mirror comprising 2 or more replicates including a $0^{th}$ replicate and each parity-encoded snapshot containing 1 or more stripes, each stripe including snapshot data pages and snapshot parity pages. The multi-node data-storage system features a snapshot operation that generates a next parity-encoded snapshot and transfers data pages of the data object from the mirror to the next-generated parity-encoded snapshot, the snapshot operation distributing each snapshot data page to the node that contained the corresponding $0^{th}$-replicate data page, distributing successive snapshot data pages to successive nodes in a cyclic order with respect to the C nodes, and distributing snapshot data and parity pages to the C nodes so that the data and parity pages of each stripe reside on different nodes and so that the data and parity pages are evenly balanced among the C nodes following distribution of a threshold number of snapshot pages.

20 Claims, 19 Drawing Sheets

U.S. PATENT DOCUMENTS

2011/0208996 A1* 8/2011 Hafner et al. .............. 714/6.24
2011/0289375 A1* 11/2011 Jiang et al. .................. 714/752
2012/0089884 A1* 4/2012 Kamiya ....................... 714/752

OTHER PUBLICATIONS

Rodrigues et al, "High Availability in DHTs: Erasure Coding vs. Replication", MIT, 2005.*

Goodson et al, "Efficient Byzantine-tolerant erasure-coded storage", IEEE, 2004.*

Hendricks et al, "Verifying Distributed Erasure-Coded Data", ACM, 2007.*

Sukun Kim, "Efficient Erasure Code for Wireless Sensor Networks", 2004.*

* cited by examiner

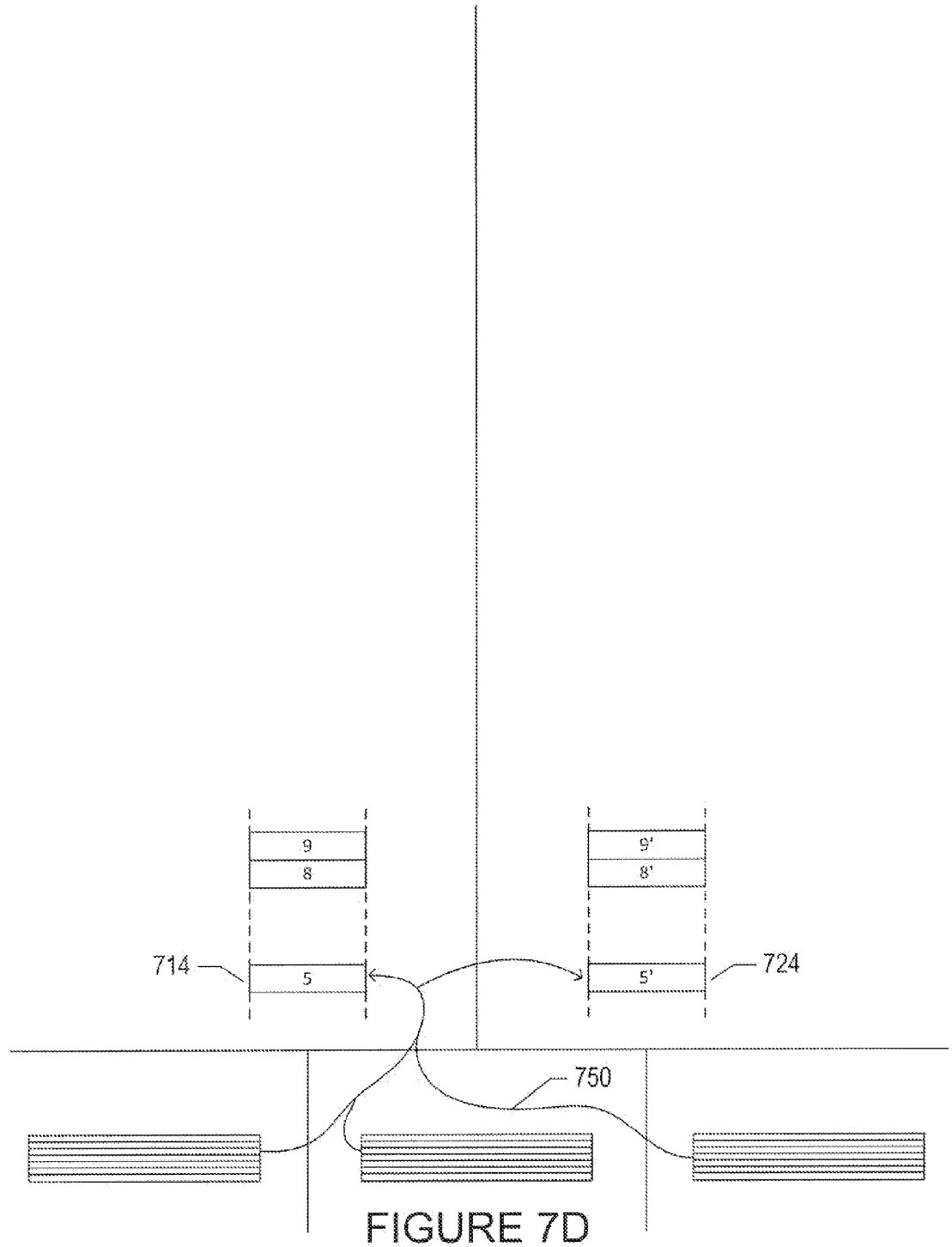

902

| 0 | 1 | 2 | 3 | 4 |
|---|---|---|---|---|
| $0_d$ | $1_d$ | P(0,1) | $3_d$ | P(2,3) |
| $5_d$ | P(4,5) | $2_d$ | P(6,7) | $4_d$ |
| P(8,9) | $6_d$ | $7_d$ | $8_d$ | $9_d$ |
| $10_d$ | $11_d$ | P(10,11) | $13_d$ | P(12,13) |

FIGURE 9A 910               911

| 0 | 1 | 2 | 3 | 4 | 5 |
|---|---|---|---|---|---|
| $0_d$ | $1_d$ | $2_d$ | P(0,2) | $4_d$ | $5_d$ |
| P(3,5) | $7_d$ | $8_d$ | $3_d$ | $10_d$ | $11_d$ |
| $6_d$ | $13_d$ | $14_d$ | P(6,8) | $16_d$ | $17_d$ |
| P(9,11) | | | $9_d$ | | |
| $12_d$ | | | P(12,14) | | |
| P(15,17) | | | $15_d$ | | |

FIGURE 9B

| 0 | 1 | 2 | 3 | 4 | 5 |
|---|---|---|---|---|---|
| $0_d$ | $1_d$ | $2_d$ | P(0,2) | $4_d$ | $5_d$ |
| P(3,5) | $7_d$ | $8_d$ | $3_d$ | P(6,8) | $11_d$ |
| $6_d$ | P(9,11) | $14_d$ | $9_d$ | $10_d$ | P(12,14) |
| $12_d$ | $13_d$ | P(15,17) | $15_d$ | $16_d$ | $17_d$ |

FIGURE 9C

METHOD AND SYSTEM FOR PARITY-PAGE DISTRIBUTION AMONG NODES OF A MULTI-NODE DATA-STORAGE SYSTEM

TECHNICAL FIELD

The present invention is related to data-storage systems and, in particular, to multi-node data-storage systems that efficiently store data objects as mirrored portions and additional portions.

BACKGROUND

In early computer systems, data was stored by individual users on magnetic tapes, punch cards, and early mass-storage devices, with computer users bearing entire responsibility for data availability, data management, and data security. The development of operating systems resulted in development of file systems with operating-system-provided interfaces and additional operating-system-provided utilities, including automated backup, mirroring, and other such utilities. With the development of high-bandwidth and inexpensive electronic communications, rapidly increasing computational bandwidths of computer systems, and relentless increase in price-performance of computer systems, an enormous variety of single-computer and distributed data-storage systems are available that span a wide range of functionality, capacity, and cost.

When data that is stored by a data-storage system has more than immediate, ephemeral utility, and even for certain types of short-lived data, users seek to store data in data-storage systems in a fault-tolerant manner. Modern data-storage systems provide for redundant storage of data, using methods that include data-object mirroring and parity encoding. In the event that a mass-storage device, computer-system node of a multi-node data-storage system, electronic communications medium or system, or other component of a data-storage system fails, any data lost as a result of the failure can be recovered automatically, without intervention by the user, in many modern data-storage systems that redundantly store data. Each of the various different methods for redundantly storing data is associated with different advantages and disadvantages. Developers of data-storage systems, vendors of data-storage systems, and, ultimately, users of data-storage systems and computer systems that access data stored in data-storage systems continue to seek improved data-storage systems that provide automated, redundant data storage and data recovery with maximum efficiency and minimum cost.

BRIEF DESCRIPTION OF THE DRAWINGS

FIGS. 7A-F illustrate a snapshot-based method by which data objects are stored in multi-node data-storage systems that represent examples of the present invention.

FIGS. 9A-C illustrate different mappings of snapshot parity pages to nodes of a multi-node data-storage system, including a mapping, shown in FIG. 9C, that represents one example of the present invention.

DETAILED DESCRIPTION

Embodiments of the present invention are directed to multi-node data-storage systems that redundantly store data objects, on behalf of users, to prevent data loss due to node or component failure. In certain embodiments of the present invention, a given data object may be initially stored using mirror redundancy, but, over time, portions of the data within the data object may migrate to parity-encoded data-storage or other types of redundant data storage by means of data-object-snapshot operations. Certain embodiments of the present invention monitor data objects within a multi-node data-object system in order to automatically trigger data-object snapshot operations in order to optimize use of data-storage capacity, minimize computational and time overheads associated with redundant storage of data objects, and, in certain embodiments of the present invention, in order to optimize additional characteristics of the multi-node data-storage system with respect to redundant storage of data objects.

Figure 1:
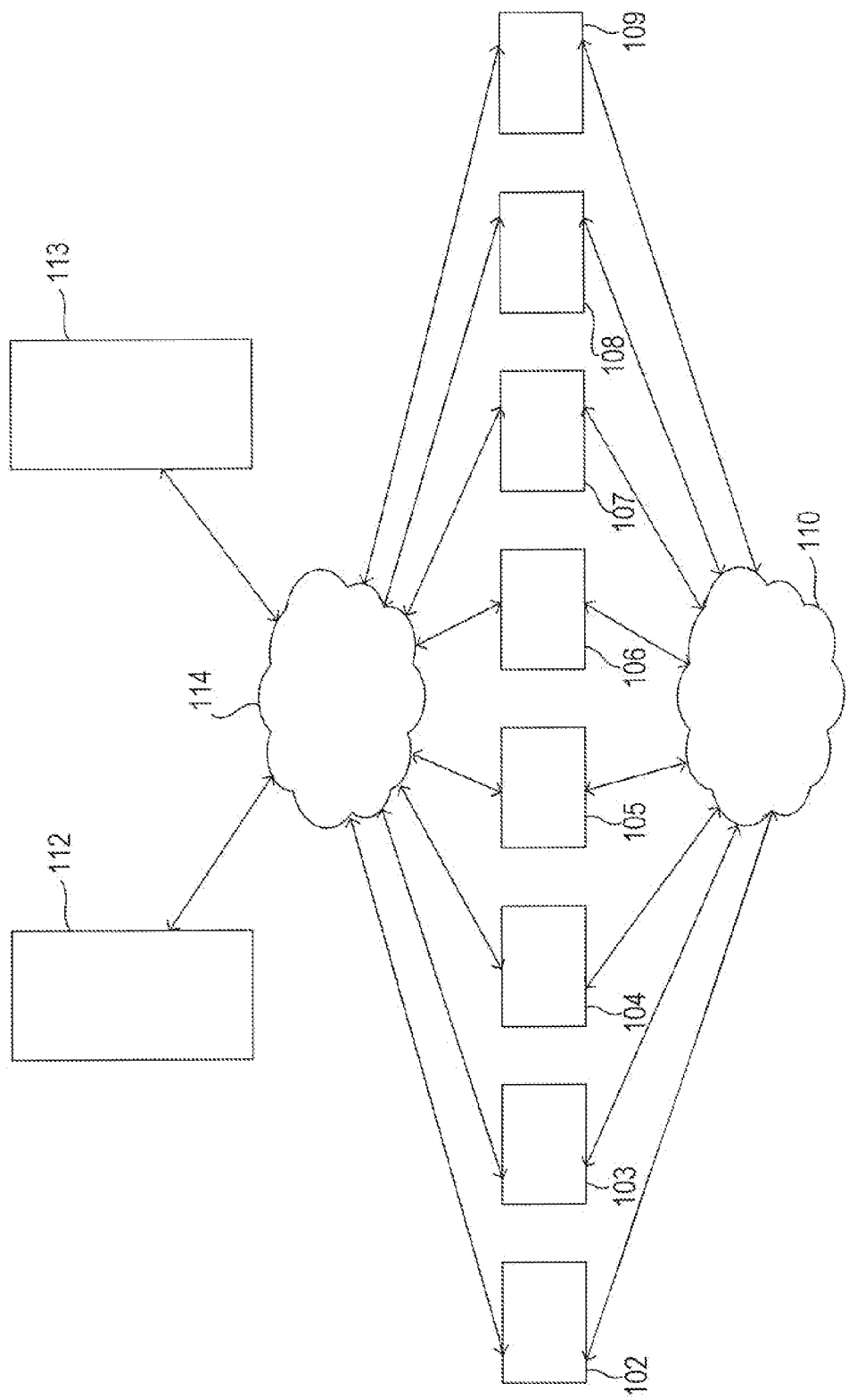
FIG. 1 shows a high level diagram of a multi-node data-storage system.

FIG. 1 shows a high level diagram of a multi-node data-storage system. A multi-node data-storage system comprises a number of small, discrete component data-storage systems 102-109, such as server computers, that intercommunicate with one another through a first communications medium 110, such as a storage-area network ("SAN") or local-area network ("LAN"), and that can receive data-storage requests and data-access requests from, and transmit responses to received data-storage requests and data-access requests to, a number of remote host computers 112-113 through a second communications medium 114, such as a local-area network ("LAN"). The first and second communications media may be a single communications medium, in certain multi-node data-storage systems, or may be two or more discrete communications media, in other multi-node data-storage systems. Each component-data-storage system 102-109 generally includes an interface through which requests can be received and responses can be transmitted to the remote host computers. In asymmetrical multi-node data-storage systems, one or a small number of the component-data-storage systems may serve as portals to the multi-node data-storage system, and may distribute requests received from remote host computers among the component-data-storage systems and forward responses from component-data-storage systems to the remote host computer systems. In symmetrical multi-node data-storage systems, each of the component-data-storage systems may receive requests from, and transmit responses to, remote host computer systems, and the component-data-storage systems in such symmetrical multi-node data-storage systems cooperate to distribute requests and data-storage among themselves. Embodiments of the present invention are applicable to both symmetrical and asymmetrical multi-node data-storage systems, as well as to other types of multi-node data-storage systems.

Figure 2:
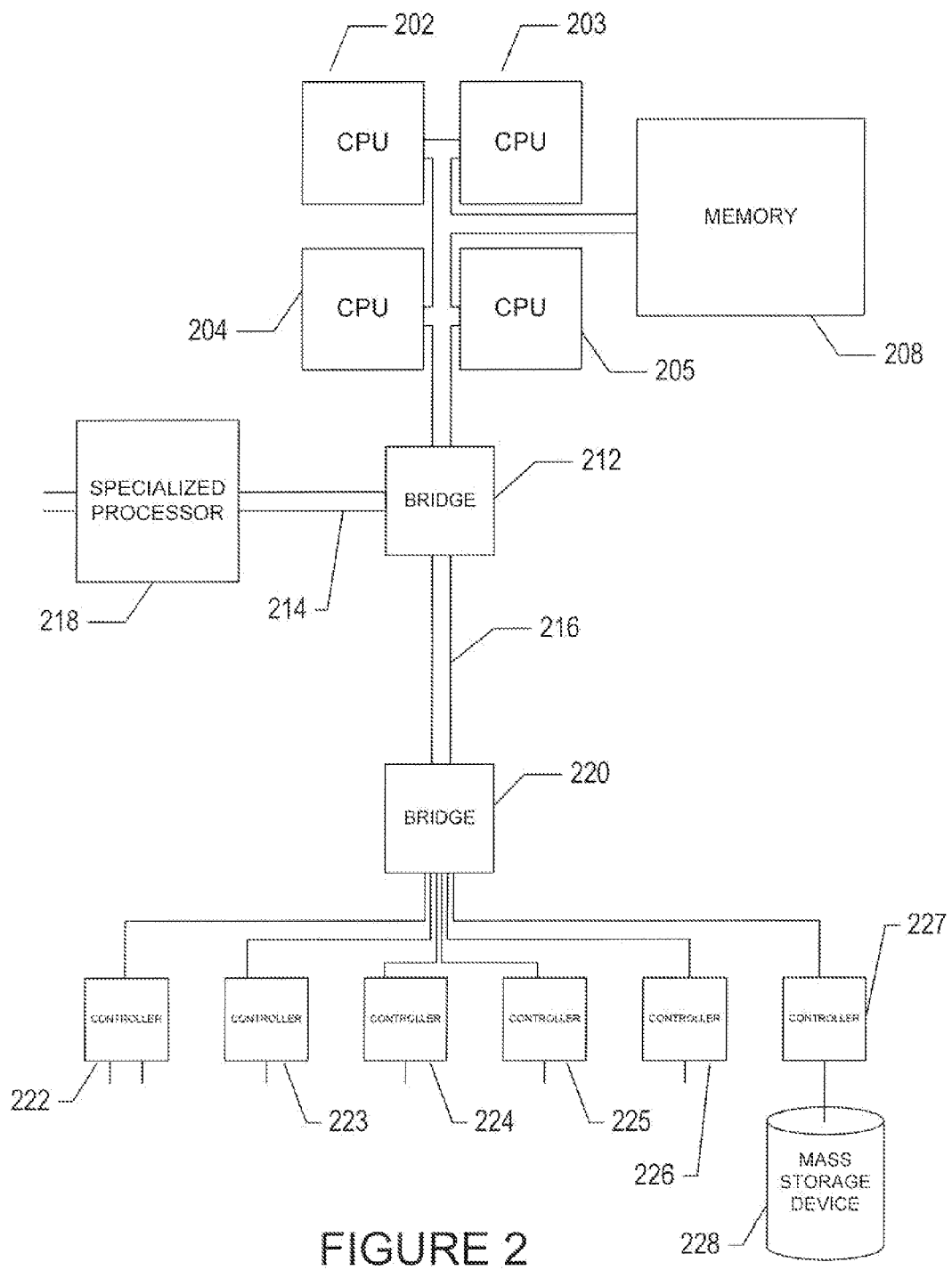
FIG. 2 illustrates a typical electronic computer that may serve as a component data-storage system within a multi-node data-storage system.

FIG. 2 illustrates a typical electronic computer that may serve as a component data-storage system within a multi-node data-storage system. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216 or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, communications transceivers, and other such components, subcomponents, and computational resources. Component data-storage system may include many additional internal components, including additional memories and memory levels, additional busses, serial interconnects, and other internal communications media, additional processors and controllers, power supplies, cooling systems, and additional components.

Data-storage systems, including multi-node data-storage system systems, provide not only data-storage facilities, but also provide and manage automated redundant data storage, so that, when portions of stored data are lost, due to a node failure, disk-drive failure, failure of particular cylinders, tracks, sectors, or blocks on disk drives, failures of other electronic components, failures of communications media, and other failures, the lost data can be recovered from redundant data stored and managed by the data-storage systems, generally without intervention by host computers, system administrators, or users. Data-storage systems may include various types of computer-readable media, including magnetic disks, electronic memories, optical disks, and other such computer-readable media on which computer instructions that implement routines and programs can be stored.

Figure 3:
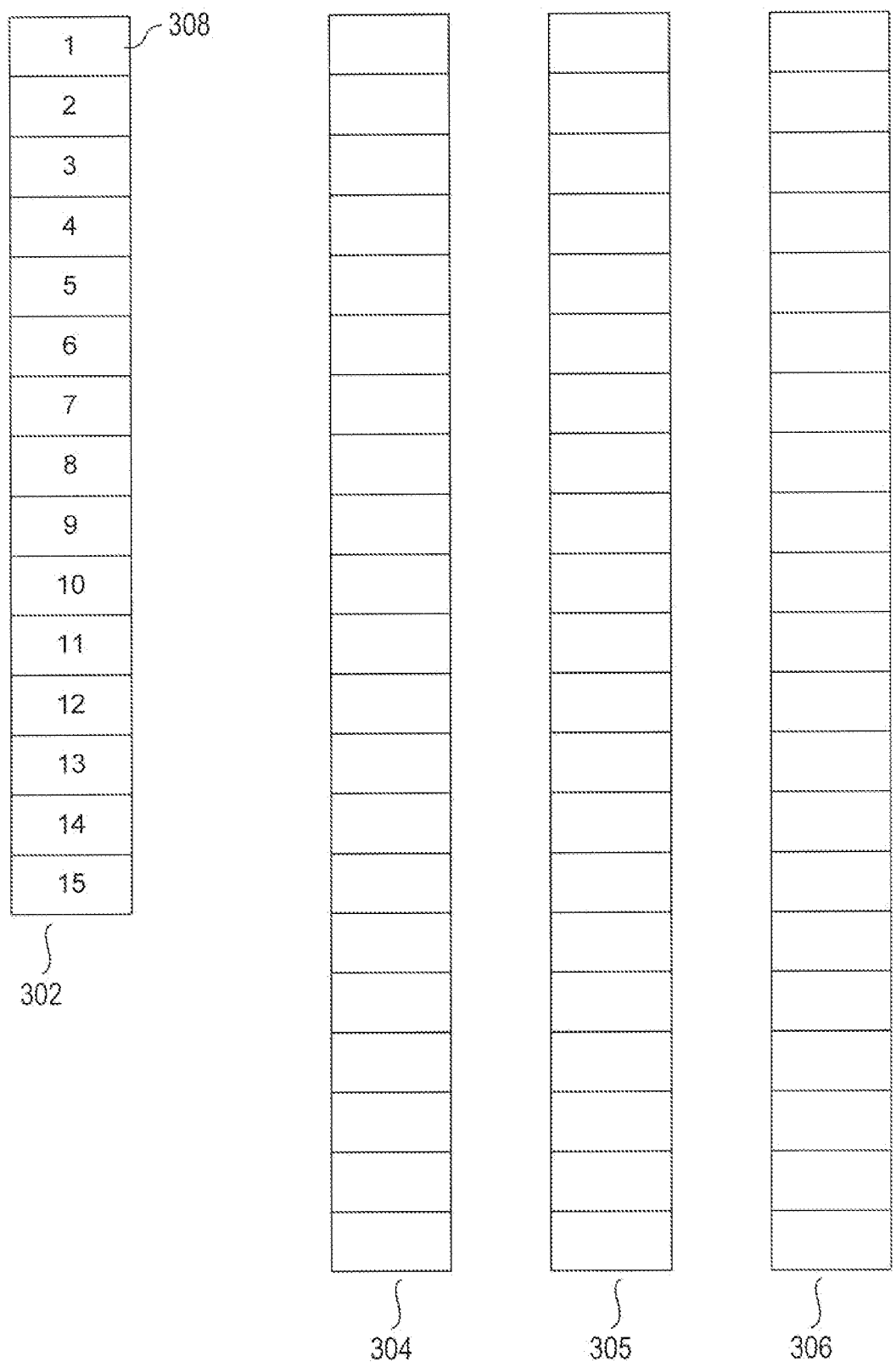
FIGS. 3-4 illustrate data mirroring.
Figure 4:
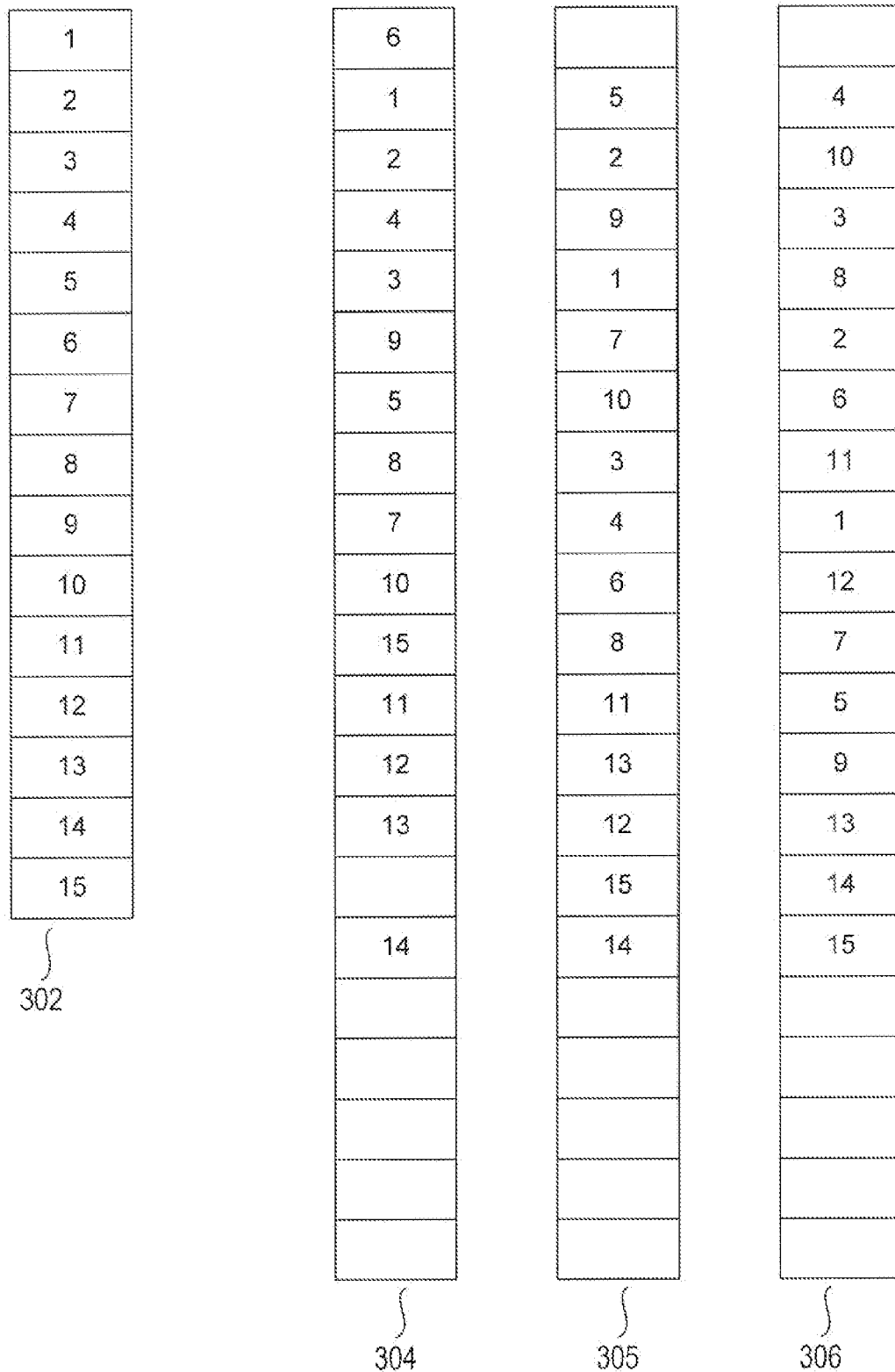

The multi-node data-storage systems that serve as a context for describing examples of the present invention automatically support at least two different types of data redundancy. The first type of data redundancy is referred to as "mirroring," which describes a process in which multiple copies of data objects are stored on two or more different nodes, so that failure of one node does not lead to unrecoverable data loss. FIGS. 3-4 illustrate the concept of data mirroring. FIG. 3 shows a data object 302 and a logical representation of a portion of the data contents of three nodes 304-306 according to an example of the present invention. The data object 302 comprises 15 sequential data units, such as data unit 308, numbered "1" through "15" in FIG. 3. A data object may be a volume, a file, a data base, or another type of data object, and data units may be blocks, pages, or other such groups of consecutively-addressed physical storage locations. FIG. 4 shows triple-mirroring redundant storage of the data object 302 on the three nodes 304-306. Each of the three nodes contains copies of all 15 of the data units within the data object 302.

In many illustrations of mirroring, the layout of the data units is shown to be identical in all mirror copies of the data object. However, in reality, a node may choose to store data units anywhere on its internal data-storage components, including disk drives. Embodiments of the present invention are generally directed to storage of data objects within a multi-node data-storage system at the node level, rather than concerned with the details of data storage within nodes. As well understood by those familiar with data-storage systems, a data-storage system generally includes many hierarchical levels of logical data-storage levels, with the data and data locations described by logical addresses and data-unit lengths at each level. For example, an operating system may provide a file system, in which files are the basic data object, with file addresses comprising path names that locate files within a hierarchical directory structure. However, at a lower level, the files are stored on particular mass-storage devices and/or in particular memories, which may store blocks of data at particular logical block locations. The controller within a mass-storage device translates logical block addresses to physical, data-storage-media addresses, which may involve identifying particular cylinders and sectors within multi-platter disks, although, when data described by such physical addresses is accessed, various additional levels of redirection may transpire before the actual physical location of the data within one or more disk platters is identified and accessed. For purposes of describing the present invention, data objects are stored as a set of one or more data pages within nodes of a multi-node data-storage system, which employs methods to ensure that the data is stored redundantly by two or more nodes to ensure that failure of a node does not result in data loss. The present invention is equally applicable to redundant storage of data within certain single-computer systems or nodes, or across multiple data-storage systems that together comprise a geographically distributed data-storage system.

In FIG. 4, the copies of the data units, or data pages, within the data object 302 are shown in different orders and positions within the three different nodes. Because each of the three nodes 304-306 stores a complete copy of the data object, the data object is recoverable even when two of the three nodes fail. The probability of failure of a single node is generally relatively slight, and the combined probability of failure of all three nodes of a three-node mirror is generally extremely small. A multi-node data-storage system may store millions, billions, trillions, or more different data objects, and each different data object may be separately mirrored over a different number of nodes within the data-storage system. For example, one data object may be mirrored over nodes 1, 7, 8, while another data object may be mirrored over nodes 2, 3, and 4.

A second type of redundancy is referred to as "erasure coding" redundancy or "parity encoding." Erasure-coding redundancy is somewhat more complicated than mirror redundancy. Erasure-coding redundancy often employs Reed-Solomon encoding techniques used for error-control coding of communications messages and other digital data transferred through noisy channels. These error-control-coding techniques use binary linear codes.

Figure 5:
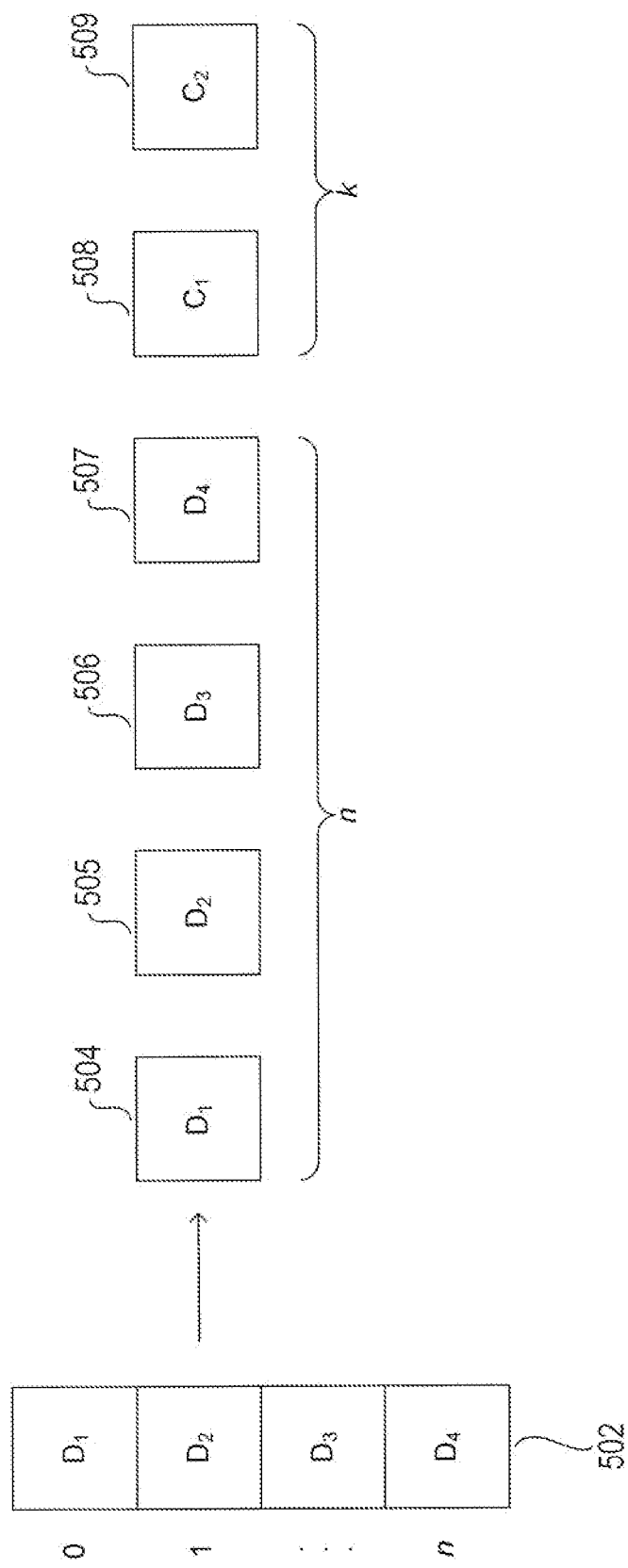
FIG. 5 shows a high-level diagram depicting erasure-coding-based data redundancy.

FIG. 5 shows a high-level diagram depicting erasure-coding-based data redundancy. In FIG. 5, a data object 502 comprising n=4 data units is distributed across six different nodes 504-509. The first n nodes 504-506 each stores one of the n data units. The final k=2 nodes 508-509 store checksum, or parity, data computed from the data object. The erasure coding redundancy scheme shown in FIG. 5 is an example of an n+k erasure-coding redundancy scheme. Because n=4 and k=2, the specific n+k erasure-coding redundancy scheme is referred to as a "4+2" redundancy scheme. Many other erasure-coding redundancy schemes are possible, including 8+2, 3+3, 3+1, and other schemes. As long as k or less of the n+k nodes fail, regardless of whether the failed nodes contain data or parity values, the entire data object can be restored. For example, in the erasure coding scheme shown in FIG. 5, the data object 502 can be entirely recovered despite failures of any pair of nodes, such as nodes 505 and 508.

Figure 6:
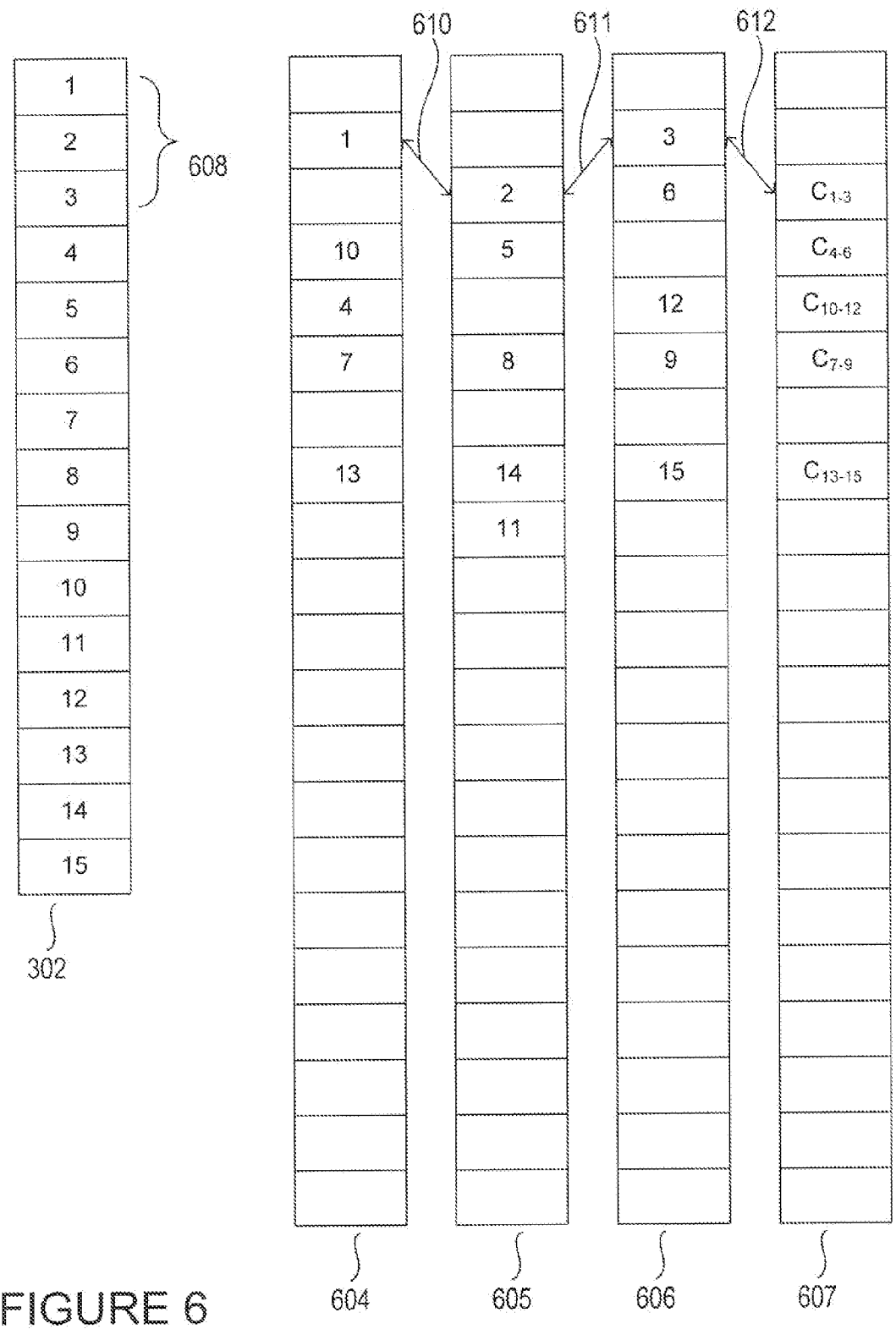
FIG. 6 shows an example 3+1 erasure-coding redundancy scheme using the same illustration conventions as used in FIGS. 3 and 4.

FIG. 6 shows an example 3+1 erasure-coding redundancy scheme using the same illustration conventions as used in FIGS. 3 and 4. In FIG. 6, the 15-data-unit data object 302 is distributed across four nodes 604-607. The data units are striped across the four disks, with each three-data-unit subset of the data object sequentially distributed across nodes 604-606, and a check sum, or parity, data unit for the stripe placed on node 607. The first stripe, consisting of the three data units 608, is indicated in FIG. 6 by arrows 610-612. Although, in FIG. 6, checksum data units are all located on a single node 607, the stripes may be differently aligned with respect to the nodes, with each node containing some portion of the checksum or parity data units.

Erasure-coding redundancy is obtained by mathematically computing checksum or parity bits for successive sets of n bytes, words, or other data units, by methods conveniently expressed as matrix multiplications. As a result, k data units of parity or checksum bits are computed from n data units. Each data unit typically includes a number of bits equal to a power of two, such as 8, 16, 32, or a higher power of two. Thus, in an 8+2 erasure coding redundancy scheme, from eight data units, two data units of checksum, or parity bits, are generated, all of which can be included in a ten-data-unit stripe. In the following discussion, the term "word" refers to a granularity at which encoding occurs, and may vary from bits to longwords or data units of greater length.

The $i^{th}$ checksum word $c_i$ may be computed as a function of all n data words by a function $F_i(d_1, d_2, \ldots, d_n)$ which is a linear combination of each of the data words $d_j$ multiplied by a coefficient $f_{i,j}$, as follows:

$$c_i = F_i(d_1, d_2, \ldots, d_n) = \sum_{j=1}^{n} d_j f_{i,j}$$

In matrix notation, the equation becomes:

$$\begin{bmatrix} c_1 \\ c_2 \\ \vdots \\ c_k \end{bmatrix} = \begin{bmatrix} f_{1,1} & f_{1,2} & \ldots & f_{1,n} \\ f_{2,1} & f_{2,2} & \ldots & f_{2,n} \\ \vdots & \vdots & & \vdots \\ f_{k,1} & f_{k,2} & \ldots & f_{k,n} \end{bmatrix} \begin{bmatrix} d_1 \\ d_2 \\ \vdots \\ d_n \end{bmatrix}$$

or:

$$C = FD$$

In the Reed-Solomon technique, the function F can be chosen to be a k×n Vandermonde matrix with elements $F_{i,j}$ equal to $j^{i-1}$, or:

$$F = \begin{bmatrix} 1 & 1 & \ldots & 1 \\ 1 & 2 & \ldots & n \\ \vdots & \vdots & & \vdots \\ 1 & 2^{k-1} & \ldots & n^{k-1} \end{bmatrix}$$

If a particular word $d_j$ is modified to have a new value $d'_j$, then a new $i^{th}$ check sum word $c'_i$ can be computed as:

$$c'_i = c_i + f_{i,j}(d'_j - d_j)$$

or:

$$c' = C + FD' - FD = C + F(D' - D)$$

Thus, new checksum words are easily computed from the previous checksum words and a single column of the matrix F.

Lost words from a stripe are recovered by matrix inversion. A matrix A and a column vector E are constructed, as follows:

$$A = \begin{bmatrix} I \\ F \end{bmatrix} = \begin{bmatrix} 1 & 0 & 0 & \ldots & 0 \\ 0 & 1 & 0 & \ldots & 0 \\ 0 & 0 & 1 & \ldots & 0 \\ \vdots & \vdots & \vdots & & \vdots \\ 1 & 1 & 1 & \ldots & 1 \\ 1 & 2 & 3 & \ldots & n \\ \vdots & \vdots & \vdots & & \vdots \\ 1 & 2^{k-1} & 3^{k-1} & \ldots & n^{k-1} \end{bmatrix}$$

$$E = \begin{bmatrix} D \\ C \end{bmatrix} = \begin{bmatrix} d_1 \\ d_2 \\ \vdots \\ d_n \\ c_1 \\ c_2 \\ \vdots \\ c^k \end{bmatrix}$$

It is readily seen that:

$$AD = E$$

or:

$$\begin{bmatrix} 1 & 0 & 0 & \ldots & 0 \\ 0 & 1 & 0 & \ldots & 0 \\ 0 & 0 & 1 & \ldots & 0 \\ \vdots & \vdots & \vdots & & \vdots \\ 1 & 1 & 1 & \ldots & 1 \\ 1 & 2 & 3 & \ldots & n \\ \vdots & \vdots & \vdots & & \vdots \\ 1 & 2^{k-1} & 3^{k-1} & \ldots & n^{k-1} \end{bmatrix} \begin{bmatrix} d_1 \\ d_2 \\ \vdots \\ d_n \end{bmatrix} = \begin{bmatrix} d_1 \\ d_2 \\ d_3 \\ \vdots \\ d_n \\ c_1 \\ c_2 \\ \vdots \\ c^k \end{bmatrix}$$

One can remove any k rows of the matrix A and corresponding rows of the vector E in order to produce modified matrices A' and E', where A' a square matrix. Then, the vector D representing the original data words can be recovered by matrix inversion as follows:

$$A'D = E'$$

$$D = A'^{-1} E'$$

Thus, when k or fewer data or checksum words are erased, or lost, k data or checksum words including the k or fewer lost data or checksum words can be removed from the vector E, and corresponding rows removed from the matrix A, and the original data or checksum words can be recovered by matrix inversion, as shown above.

While matrix inversion is readily carried out for real numbers using familiar real-number arithmetic operations of addition, subtraction, multiplication, and division, discrete-valued matrix and column elements used for digital error control encoding are suitable for matrix multiplication when the discrete values form an arithmetic field that is closed under the corresponding discrete arithmetic operations. In general, checksum bits are computed for words of length w:

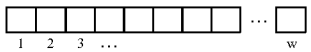

A w-bit word can have any of $2^w$ different values. A mathematical field known as a Galois field can be constructed to have $2^w$ elements. The arithmetic operations for elements of the Galois field are, conveniently:

$$a \pm b = a \oplus b$$

$$a * b = \text{anti log } [\log(a) + \log(b)]$$

$$a \div b = \text{anti log } [\log(a) - \log(b)]$$

where tables of logs and antilogs for the Galois field elements can be computed using a propagation method involving a primitive polynomial of degree w.

Mirror-redundancy schemes are conceptually simpler, and easily lend themselves to various reconfiguration operations. For example, if one node of a 3-node, triple-mirror-redundancy scheme fails, the remaining two nodes can be reconfigured as a 2-node mirror pair under a double-mirroring-redundancy scheme. Alternatively, a new node can be selected for replacing the failed node, and data copied from one of the surviving nodes to the new node to restore the 3-node, triple-mirror-redundancy scheme. By contrast, reconfiguration of erasure coding redundancy schemes is not as straightforward. For example, each checksum word within a stripe depends on all data words of the stripe. If it is desired to transform a 4+2 erasure-coding-redundancy scheme to an 8+2 erasure-coding-redundancy scheme, then all of the checksum bits may be recomputed, and the data may be redistributed over the 10 nodes used for the new, 8+2 scheme, rather than copying the relevant contents of the 6 nodes of the 4+2 scheme to new locations. Moreover, even a change of stripe size for the same erasure coding scheme may involve recomputing all of the checksum data units and redistributing the data across new node locations. In most cases, change to an erasure-coding scheme involves a complete construction of a new configuration based on data retrieved from the old configuration rather than, in the case of mirroring-redundancy schemes, deleting one of multiple nodes or adding a node, with copying of data from an original node to the new node. Mirroring is generally significantly less efficient in space than erasure coding, but is more efficient in time and expenditure of processing cycles. For example, in the case of a one-block WRITE operation carried out on already stored data, a mirroring redundancy scheme involves execution of a one-block WRITE to each node in a mirror, while a parity-encoded redundancy scheme may involve reading the entire stripe containing the block to be written from multiple nodes, recomputing the checksum for the stripe following the WRITE to the one block within the stripe, and writing the new block and new checksum back to the nodes across which the stripe is distributed.

Figure 7A:
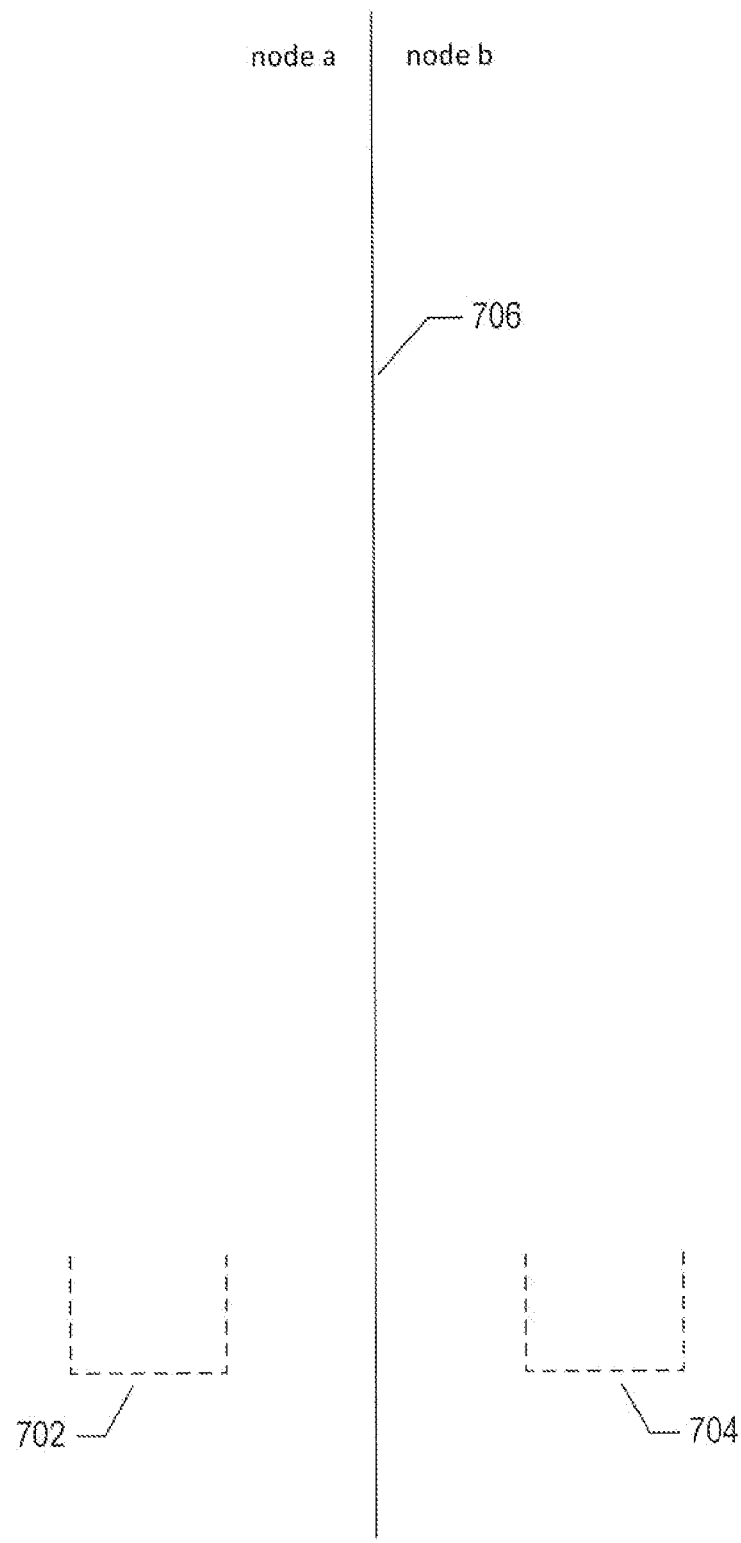

FIGS. 7A-F illustrate a snapshot-based method by which data objects are stored in multi-node data-storage systems that represent examples of the present invention. Initially, a data object is stored as multiple copies using mirror redundancy. FIG. 7A illustrates a data object, following creation, in which a mirror pair 702 and 704 of copies of the data object is created on nodes a and b of a multi-node distributed data-storage system. In FIG. 7A, and in subsequent FIGS. 7B-F, the vertical line 706 in the center of the figure represents a boundary between nodes a and b. Thus, the nascent data object is stored in duplicate, with a first copy 702 residing within node a and a second copy 704 residing within node b. A mirror pair is maintained synchronously, so that any updates to a first copy are forwarded to, and carried out on, all other copies of the mirror. In distributed systems, techniques may be used to ensure that no WRITE operation is committed to any member of the mirror unless the WRITE operation is guaranteed to be subsequently or concurrently carried out on all other members.

Figure 7B:
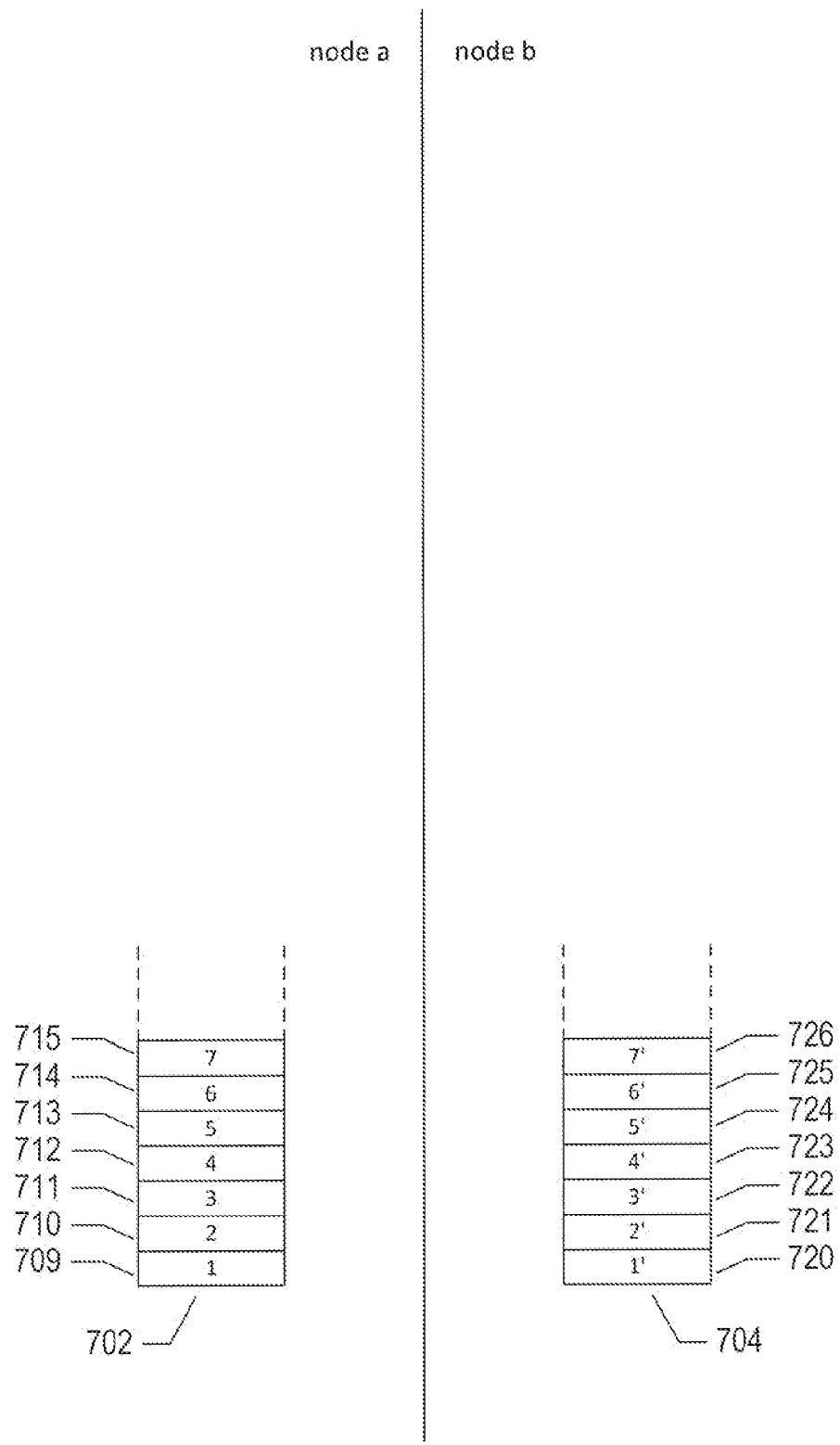
Figure 7C:
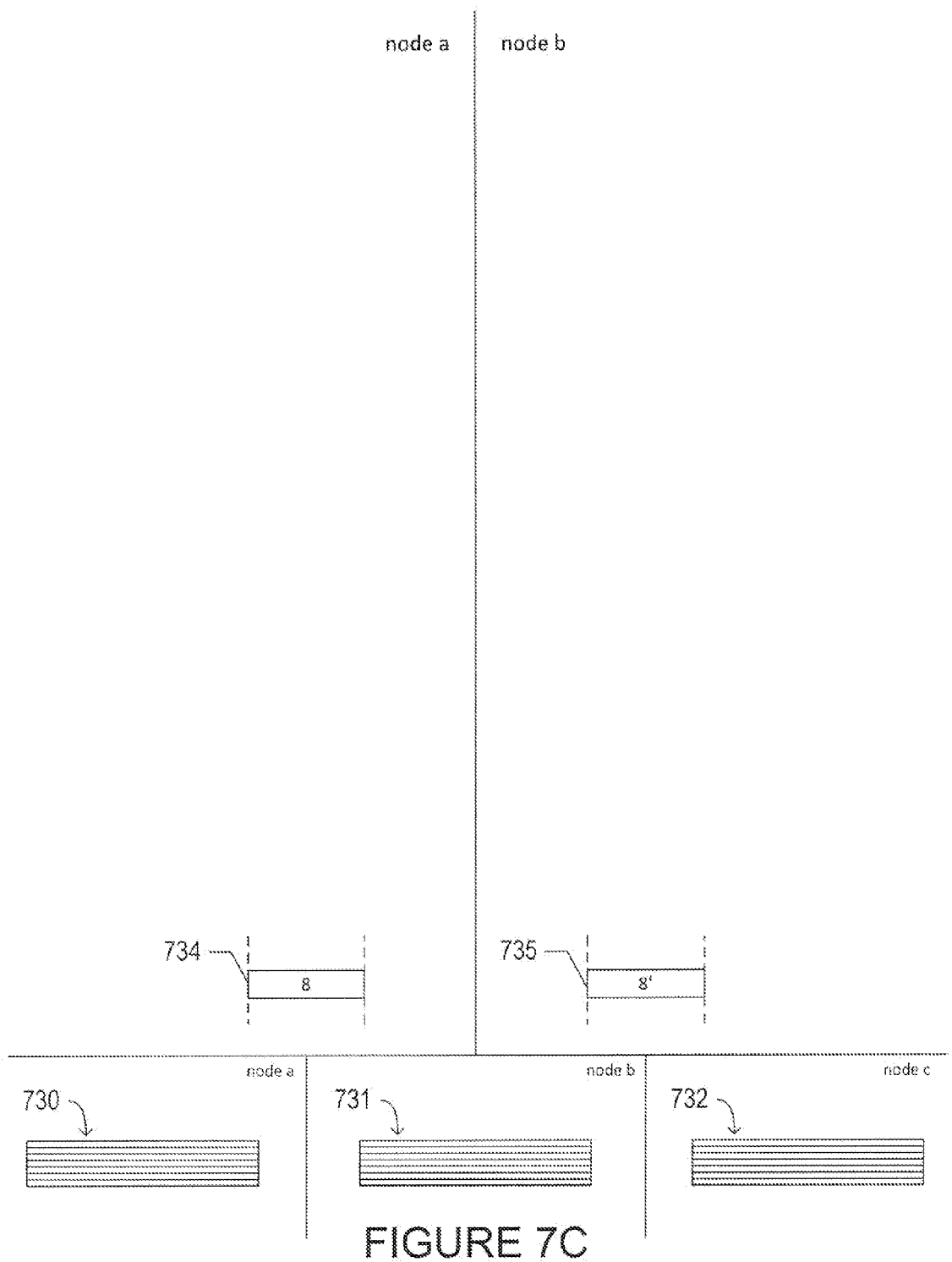

As shown in FIG. 7B, following creation of the data object, host computers may direct WRITE operations to the nascent data objects to store data units within the data objects. In FIG. 7B, for example, the data object contains seven data units, data units 710-715 in the first copy 702 on node a and data units 720-726 in the second copy 704 on node b. As discussed above, mirroring of data objects is expensive in data-storage capacity, since two or more complete copies of each data unit of the data object are stored. However, mirroring is easily implemented, can be flexibly redistributed among nodes of a multi-node data-storage system, and provides rapid write access to data units within the data object. In many cases, particularly in archiving data-storage systems, writing of data objects occurs most frequently within a small subset of the most recently written and/or created data units within a data object. Much of the earlier-written and/or earlier-created data units within a data object tend to be infrequently accessed, after a period of time, and even less frequently accessed for WRITE operations. This being the case, examples of the present invention employ a snapshot operation by which mirrored data associated with a data object can be transformed to parity-encoded data, with subsequently created data or data subsequently accessed for WRITE operations stored separately by mirror redundancy. Thus, for example, a first snapshot operation carried out on the data object shown in FIG. 7B generates a partially mirrored, partially parity-encoded data object, as shown in FIG. 7C. The original seven data units stored by mirror redundancy within the data object, shown in FIG. 7B, are moved, by the snapshot operation, into parity-encoded data storage 730-732 in FIG. 7C, in which the parity-encoded data units are striped across three nodes, while a data unit 734-735 written to the data object following the snapshot operation is stored by mirror redundancy in a mirrored portion of the data object.

In FIG. 7C, the parity-encoded portion of the data object is shown distributed among three nodes, while the mirrored portion of the data object is shown distributed among two nodes. In fact, the mirrored portion of the data object may be mirrored across any two or more nodes, depending on various considerations and administrative decisions, and the parity-encoded portion of a data object corresponding to a particular snapshot level may be distributed across a number of nodes, including the same nodes, overlapping nodes, or different nodes with respect to the nodes across which the mirrored portion of the data object is mirrored. In certain examples of the present invention, the mirrored portion of a data object may be collocated with all or a portion of the parity-encoded portion.

As shown in FIG. 7D, following a first snapshot operation, discussed above with reference to FIG. 7C, WRITE access has been made to the fifth data unit which, following the first snapshot operation, resides in the parity-encoded portion of the data object associated with the first snapshot level. In this case, as indicated by curved arrows in FIG. 7D, such as curved arrow 750, the fifth data unit is reassembled from the parity-encoded portion of the data object and copied 714 and 724 to the mirrored portion of the data object, prior to carrying out the WRITE operation, in the case that the WRITE operation does not write the entire fifth data unit. Thus, multiple copies of data units may end up stored by the multi-node data-storage system as a result of subsequent write access to data units that have been moved to parity-encoded portions of the data object associated with snapshot levels.

Figure 7E:
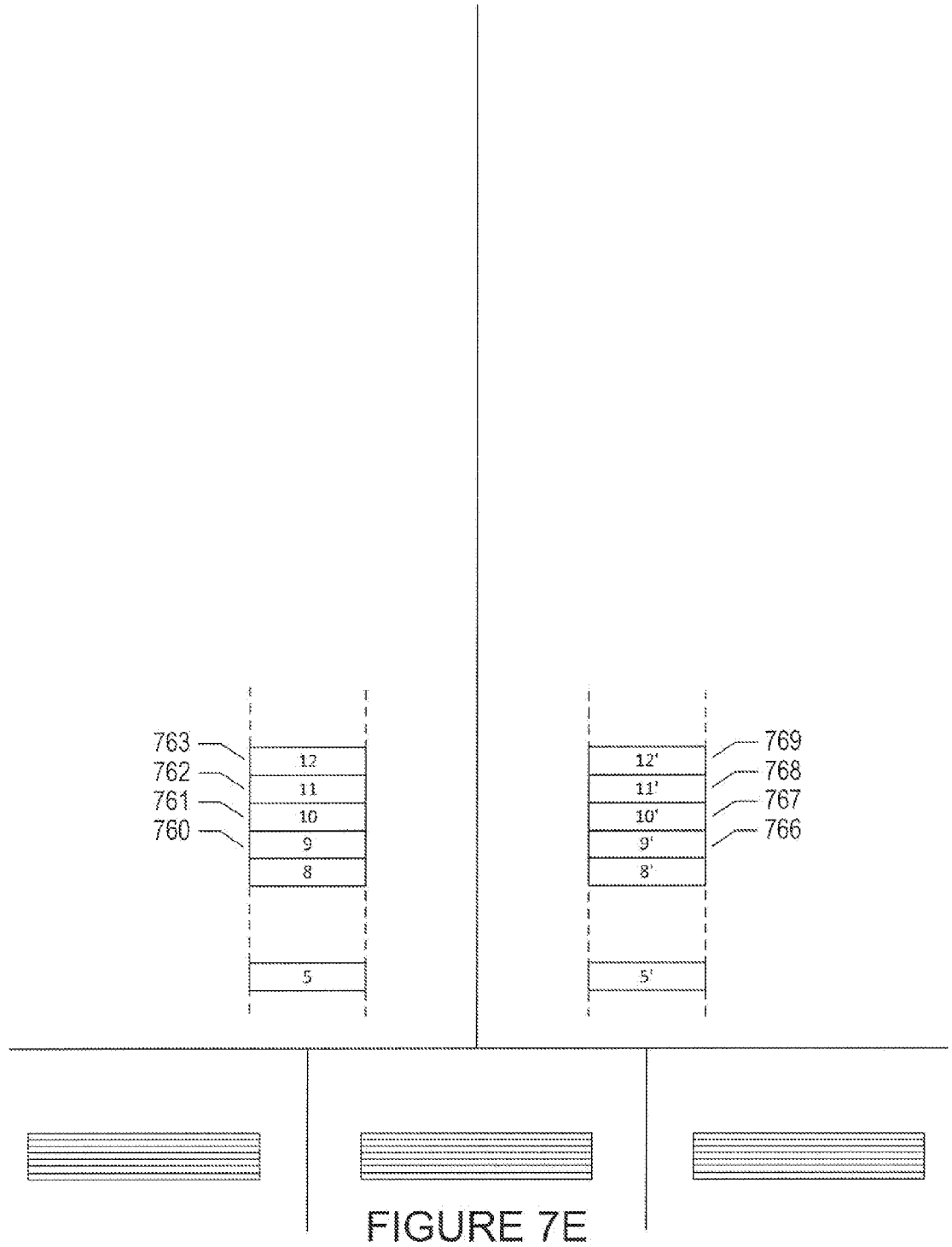
Figure 7F:
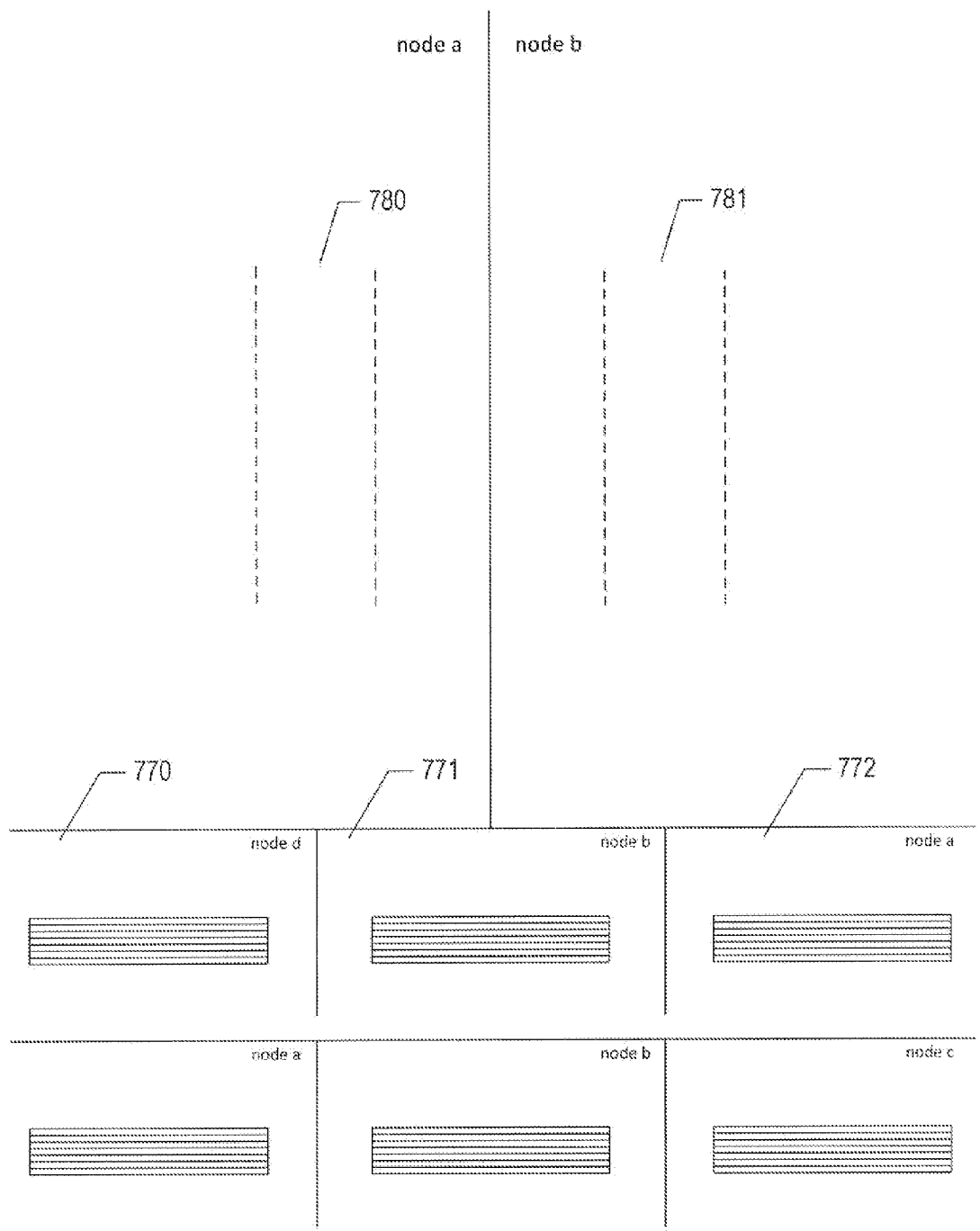

As shown in FIG. 7E, additional write-access operations are carried out that result in additional data units 760-763 and 766-769 being stored within the mirrored portion of the data object. At this point in time, as shown in FIG. 7F, a second snapshot operation may be undertaken, to generate a second level 770-772 of parity-encoded data units within the data object. As with any snapshot operation, a mirrored-portion of the data object 780-781 remains available for subsequent data-unit creation or write access to previously created data units.

In certain multi-node data-storage systems, multiple parity-encoded data sets corresponding to multiple snapshot levels may be merged, at various points in time, and, in certain cases, may be moved to slower and cheaper data-storage components and/or media. For example, in data archiving systems, older parity-encoded data sets associated with snapshot levels that have not been accessed for a long period of time may be transferred from expensive, fast disk drives to cheaper, slower disk drives or to tape-based archives.

When creating and storing snapshots across the nodes of a multi-node data storage system, a well-considered data-layout strategy can provide significant efficiency in subsequent data-access operations. In the following discussion, a mirrored data object and data-object snapshots are considered to comprise a sequence of data pages. Page-layout methods that represent examples of the present invention incorporated within multi-node data storage systems that represent examples of the present invention are used to distribute the pages associated with a snapshot across nodes of a multi-node data-storage system so that subsequent copy-on-write operations need minimal inter-node data transfer and so that parity pages are evenly distributed across a set of C nodes of a multi-node system. The parity pages are assumed to be generated by an N+K erasure-coding-redundancy scheme, as discussed above.

Figure 8A:
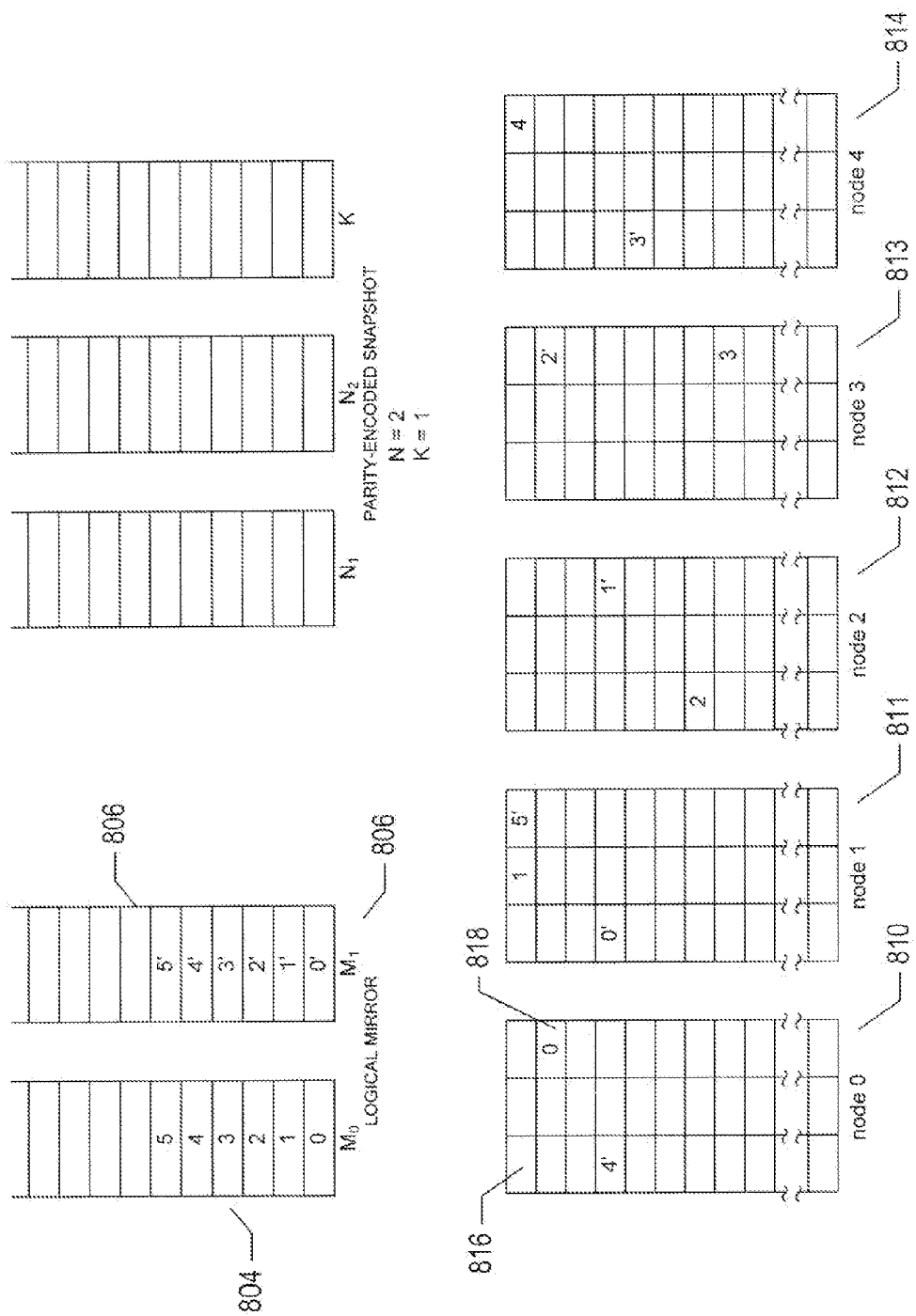
FIGS. 8A-B illustrate mapping of snapshot parity pages to nodes of a multi-node data-storage system.
Figure 8B:
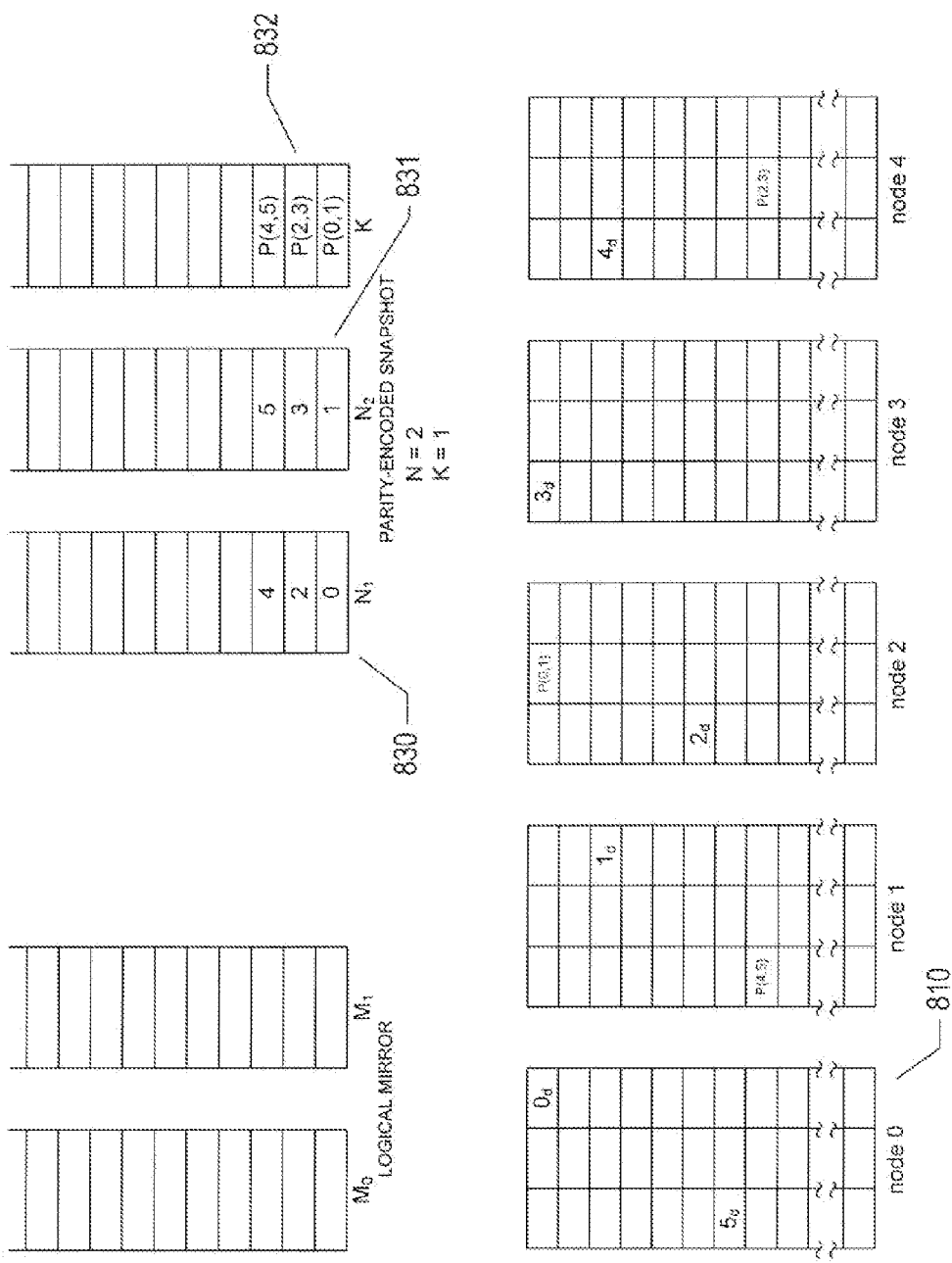

FIGS. 8A-B illustrate mapping of snapshot parity pages to nodes of a multi-node data-storage system. FIGS. 8A-B both use the same illustration conventions next discussed with reference to FIG. 8A. In FIG. 8A, 6 data pages of a data object, pages 0-5, are shown in a two-way mirror 802 that includes the 6 data pages 0-5 of a first mirror copy $M_0$ (804 in FIG. 8A) of the data object and 6 replicate data pages 0'-5' 806 of a second mirror copy $M_1$ (806 in FIG. 8A) of the data object. In the lower portion of FIG. 8A, the pages of the mirror copies $M_0$ and $M_1$ are shown distributed among C=5 nodes 810-814 of a multi-node data-storage system. In FIG. 8A, each node is shown as containing a large number of pages represented by cells, such as cell 816. The numeric entries within certain cells, such as the numeric entry "0" in cell 818 in the representation of node 0 (810 in FIG. 8A), indicate storage of the data page with a corresponding page number within the mirror 802 within that cell.

A cyclic distribution of data pages can be observed in FIG. 8A, with data page n stored on node n MOD C, for all n=0, 1, . . . , 5. The operation "MOD" is the modulo operation that returns the remainder following integer division. The data page n of replicate m is stored on node (n MOD C)+m. Thus, in FIG. 8A, the layout of the replicate $M_1$ data pages is shifted, by one node, from the layout of mirror-copy M0 data pages. This layout strategy ensures that the $M_0$ mirror-copy page n and all replicate pages corresponding to $M_0$ page n reside on different nodes. Of course, C is greater than, or equal to, the total number of mirror copies m+1.

FIG. 8B illustrates the data-page layout for the pages 0-5 of the data object shown in FIG. 8A following a snapshot operation. In the example of FIGS. 8A-B, a N=2, K=1 redundancy scheme is used, with the snapshot logically represented by three column 830-832 at the upper right of FIG. 8B. The data pages 0-5 and 0'-5' shown in Figure A become, as a result of a snapshot operation, data pages $0_d$-$5_d$ and parity pages P(0,1), P(2,3), and P(4,5). The parity-page notation indicates the range of data pages in the stripe containing the parity page. When K>1, subscripts are used to indicate the individual parity pages within a stripe, such as $P_0(0,4)$ and $P_1(0,4)$ for an N=5, K=2 redundancy scheme.

In a snapshot data-page layout used in certain examples of the present invention, each data page of the snapshot is distributed to the same node that originally stored the $M_0$ copy of the page. This reduces inter-node data transfer on subsequent copy-on-write operations, since the $M_0$ copy of a copied data page resulting from a copy-on-write operation resides on the same node as the corresponding snapshot data page. For example, in FIG. 8B, a copy-on-write operation directed to data page 0 would produce an $M_0$ page 0 on the same node, node 0 (810 in FIG. 8B), that contains snapshot page $0_d$. Thus, the data pages are cyclically distributed so that the node for snapshot data page n is computed as n MOD C. And additional efficiency is provided with respect to read operations. Because there may be multiple parity-encoded snapshots and because snapshots are generally sparse, a reader may need to seek a most recent copy of a data page among numerous different parity-encoded snapshots. Because of the snapshot data-page layout used in certain examples of the present invention, in which all copies of a particular data page of multiple parity-encoded snapshots are collocated on a node that stored the corresponding $M_0$ data page, a reader needs only to direct a read operation to a single node, rather than search among multiple nodes for the various different versions of s data page stored in multiple parity-encoded snapshots, in order to find a most current version of a particular data page. In the snapshot-page distribution scheme shown in FIG. 8B, the first parity page for each two-data-page stripe is distributed to the node following the node to which the last data page of the stripe is distributed. In general, the scheme would distribute the $k^{th}$ parity-page for stripe L/N, where L is the number of the first page in the stripe and either k∈{0, . . . , K} when K>1 or k=0 when K=1, to node (L+N+k) MOD C. Again, C is greater than, or equal to, N+K, so that the data and parity pages of each stripe are located on different nodes.

Unfortunately, the page-distribution scheme used in the example of FIG. 8B is suboptimal. Although the pages of each stripe are located on different nodes, and the data pages of a snapshot are located on the same nodes as the corresponding $M_0$ pages were located, the distribution of snapshot pages may become unbalanced in many configurations. FIGS. 9A-C illustrate different mappings of snapshot parity pages to nodes of a multi-node data-storage system, including a mapping, shown in FIG. 9C, that represents one example of the present invention. In FIGS. 9A-C, each column represents snapshot pages distributed to a particular node, with the node number above the column. For example, in FIG. 9A, pages $0_d$, $5_d$, P(8,9), and $10_d$ are shown to be located in node 0 (column 902 in FIG. 9A). FIG. 9A shows the distribution of 14 data pages and 7 parity pages of an N=2, K=1 redundancy scheme across C=5 nodes according to the page-distribution technique described above with reference to FIG. 8B. The page-distribution technique, in this case, produces a desirable even distribution of snapshot pages across the 5 nodes. However, as shown in FIG. 9B, when the same page-distribution is applied to a C=6, N=3, K=1 example, the snapshot pages are not evenly distributed among the 6 nodes. Instead, the parity pages all end up distributed to nodes 0 and 3 (910-911 in FIG. 9B).

Embodiments of the present invention are directed to distribution of snapshot parity pages within a multi-node data-storage system that results in a balanced distribution of snapshot pages among a set of C nodes. FIG. 9C, using the same illustration conventions used in FIGS. 9A-B, illustrates an alternative parity-page distribution method that represents one example of the present invention, applied to the C=6, N=3, K=1 example of FIG. 9B. In FIG. 9C, parity pages are distributed so that all 6 nodes have been each been given four data and/or parity pages. In addition, the data pages are, assigned to the nodes that contained the original M0 mirror-copy pages, according to the mirror-copy-page distribution method discussed above with reference to FIG. 8A, and all pages of each four-page stripe containing three data pages and one parity page are located on different nodes. The snapshot-page distribution shown in FIG. 9C is optimal with respect to the constraints of locating data pages on the same node as corresponding M0 pages, ensuring that all pages of a given stripe are located on different nodes, and evenly distributing snapshot pages among the C nodes.

FIG. 10 illustrates a method for snapshot-parity-page mapping that represents one example of the present invention. FIG. 10 illustrates the snapshot-page-distribution method by which the page distribution shown in FIG. 9C is obtained. The data pages of stripes are written together across successive nodes in cyclic order. For example, the first 3 data pages $0_d$-$2_d$ of the N=3, K=1 snapshot are written to nodes 0, 1, and 2, represented by block 1002 in FIG. 10. The remaining C−N nodes to which parity pages of the stripe can be written, represented by the dashed-line block 1004, are then considered. For the first stripe, the node in the block of remaining nodes with offset 0, 1006, is used to store the first parity page for the stripe. Note that, in FIG. 10, small arrows, such as arrow 1007, indicate the offset within the currently-considered block of remaining nodes. Additional parity pages of the stripe are stored in successive nodes within the block of remaining nodes 1004 in cyclic order. Once the data and parity pages of the first stripe are written to the multi-node data-storage system, the data pages of the next stripe are written to the next set of nodes, in cyclic order, with respect to the nodes to which the data pages of the previous stripe were written, represented by block 1008 in FIG. 10. Then, the remaining C−N nodes available for parity pages, represented by dashed block 1010, are considered. The offset is advanced by one position, in cyclic order, and the parity pages are placed into successive nodes within the block of remaining nodes, in cyclic order, starting with node corresponding to the new offset 1012. Then, the data pages of the third stripe are distributed among nodes of the next node block 1014, and the remaining C−N nodes, represented by dashed-line block 1016, are considered, with the offset advanced by one to point to the final node in the block 1018. Distribution of additional stripes would repeat the cycle of distribution shown in FIG. 10, with the offset for the next stripe distribution returning to the 0 offset indicated for the set of remaining nodes for parity pages 1004. The method illustrated in FIG. 10 is generally applicable to stripe distribution, regardless of the values of N and K for the redundancy scheme, providing that the constraint C>=N+K is satisfied.

Figure 10A:
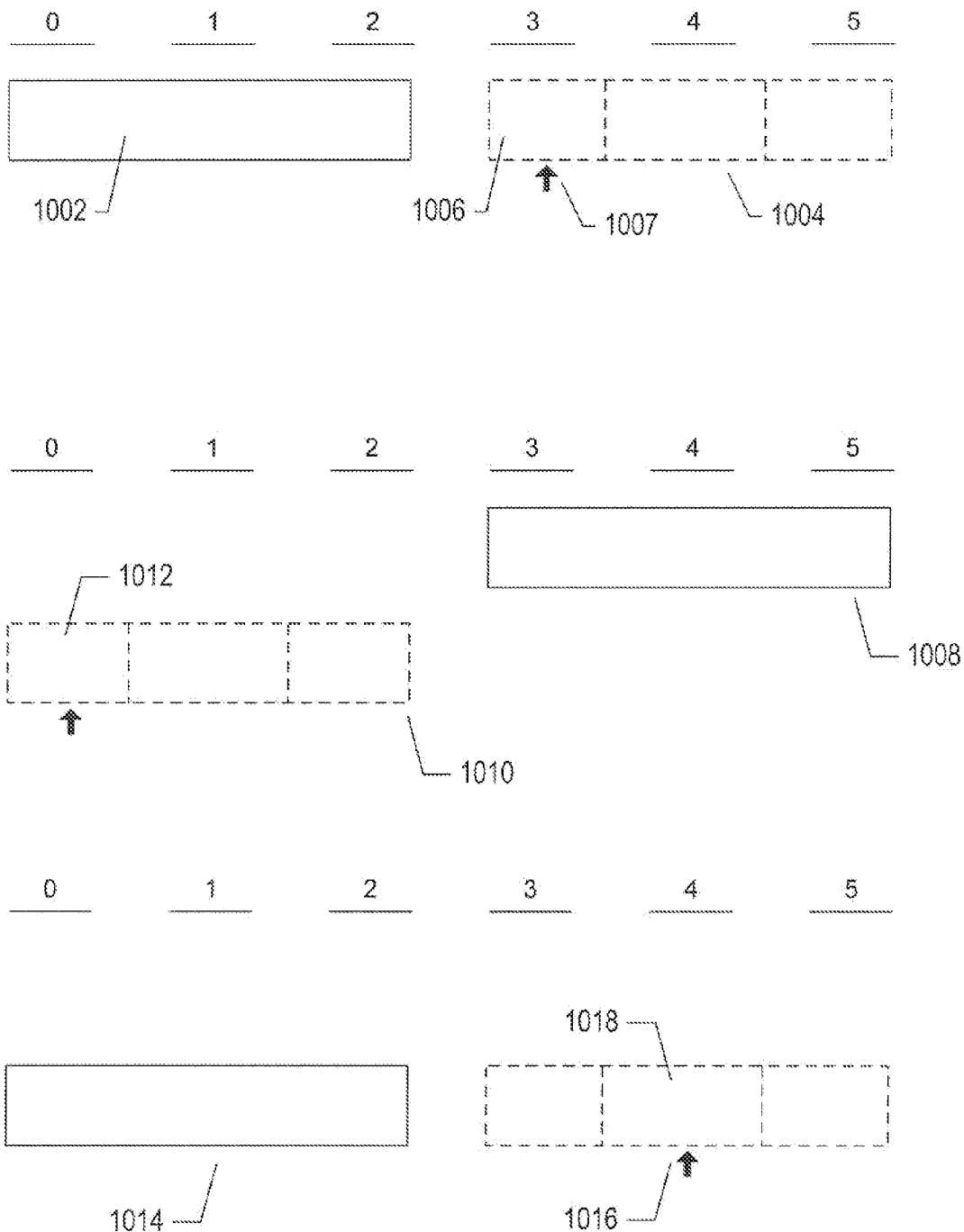
FIGS. 10A-B illustrate a method for snapshot-parity-page mapping that represents one example of the present invention.
Figure 10B:
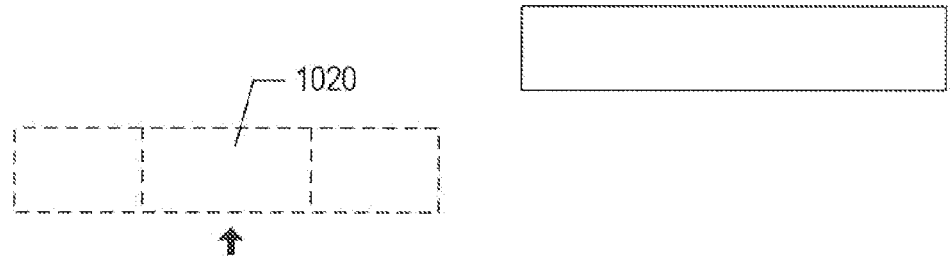
Figure 10B:
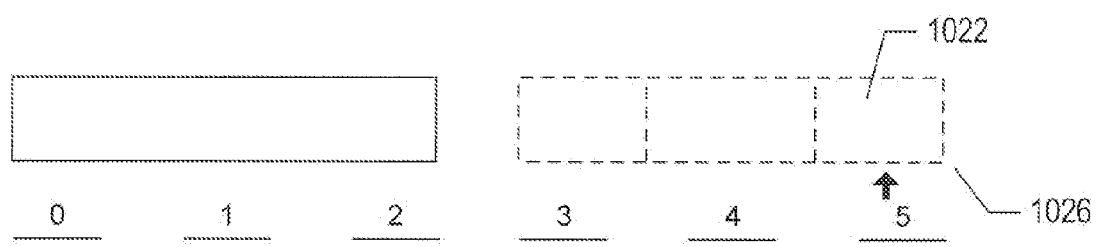
Figure 10B:
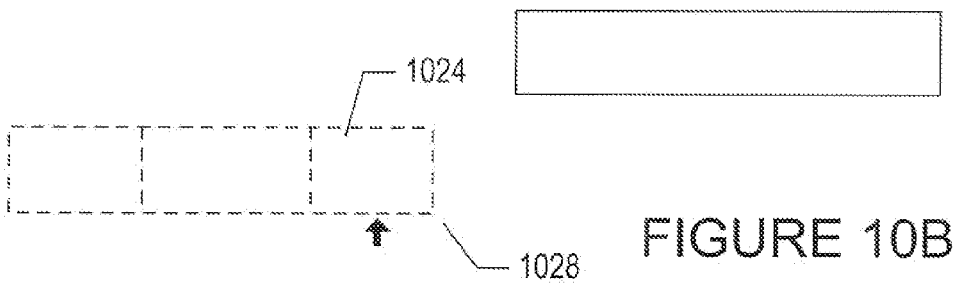

FIGS. 10A-B illustrate a method for snapshot-parity-page mapping that represents one example of the present invention. FIGS. 10A-B illustrate the snapshot-page-distribution method by which the page distribution shown in FIG. 9C is obtained. The data pages of stripes are written together across successive nodes in cyclic order. For example, the first three data pages $0_d$-$2_d$ of the N=3, K=1 snapshot are written to nodes 0, 1, and 2, represented by block 1002 in FIG. 10A. The remaining C−N nodes to which parity pages of the stripe can be written, represented by the dashed-line block 1004, are then considered. For the first stripe, the node in the block of remaining nodes with offset 0, 1006, is used to store the first parity page for the stripe. Note that, in FIG. 10, small arrows, such as arrow 1007, indicate the offset within the currently-considered block of remaining nodes.

When K>1, the additional parity pages of the stripe are stored in successive nodes within the block of remaining nodes 1004 in cyclic order. Once the data and parity pages of the first stripe are written to the multi-node data-storage system, the data pages of the next stripe are written to the next set of nodes, in cyclic order, with respect to the nodes to which the data pages of the previous stripe were written, represented by block 1008 in FIG. 10A. Then, the remaining C−N nodes available for parity pages, represented by dashed block 1010, are considered.

Because the stripes are stored in cyclic fashion, the writing of stripes generally cycles through some number of node starting positions and parity-page offsets within the blocks of remaining nodes, beginning with an initial node starting position and parity-page offset, until, after a number Q of stripes have been written, the next stripe to be written begins at the same node position and uses the same parity-page offset as the first stripe. In other words, the starting-position and parity-page-offset combinations recycle after each group of Q stripes have been written. In the following, each consecutive run of Q stripes is referred to as the "major cycle." In general, the starting node for the next block of N data pages cycles through a number of starting positions multiple times within the major cycle. This cycle of G stripes is referred to as "minor cycle." In special cases, there may be a single minor cycle within the major cycle, and in very special cases, Q and G may both equal 1. The values of Q and G can be calculated from the cumber of nodes, C, and the number of data pages per strip, N, as follows:

$GCD(C,N)$=greatest common denominator of $C$ and $N$ $G=C/GCD(C,N)$ $Q=(C-N)*G$ For example, in the case of C=6 and N=3, as in FIG. 9C, GCD(C, N)=3, G=2, and Q=6. In FIG. 9C, an entire major cycle is therefore shown, since the next data page $18_d$ would be distributed to node 0, like data page $0_d$, and the parity-page offset within the block or remaining nodes for the next stripe would again be 0, as discussed at greater length, below. The data page $6_d$, the first data page of the third stripe, resides on node 0, just as data page $0_d$, confirming that the minor cycle comprises G=2 stripes.

Designating the page number of the first page within a stripe as L, then the offset for the first parity page of the stripe is computed as $((L/N)/G) \bmod (C-N)$ in certain examples of the present invention. Thus, the offset for the first parity page remains the same for all the stripes in each minor cycle, and is incremented by 1 at each minor-cycle boundary within the major cycle. As shown in FIG. 10A, the second stripe again uses the first node 1012 of the next block of remaining C−N nodes 1010 for writing the first parity page. In other words, the second stripe is within the first minor cycle, and therefore continues to use the offset 0 used by all stripes in the first minor cycle. When the third stripe is written, the next node block 1014 is again followed by a block of remaining C−N nodes 1016, but because the third stripe is in a second minor cycle, the offset is advanced to the second node within the block of remaining nodes 1018 or, in other words, the offset is incremented by 1 to the value 1. As shown in FIG. 10B, when the fourth stripe is written, the first parity block for the fourth strip is again written to the second node 1020 of the block of remaining nodes, since the fourth stripe, like the third stripe, is within the second minor cycle. Finally, for writing of the fifth and sixth stripes, both in a third minor cycle, the parity-page offset is incremented to 2, and therefore the third node 1022 and 1024 of the blocks of remaining C−N nodes 1026 and 1028, respectively, is distributed the first parity page. Distribution of additional stripes would repeat the cycle of distribution shown in FIGS. 10A_B, with the offset for the next stripe distribution returning to 0 for the first stripe of the next major cycle. The method illustrated in FIGS. 10A-B is generally applicable to stripe distribution, regardless of the values of N and K for the redundancy scheme, providing that the constraint C>=N+K is satisfied.

Figure 11:
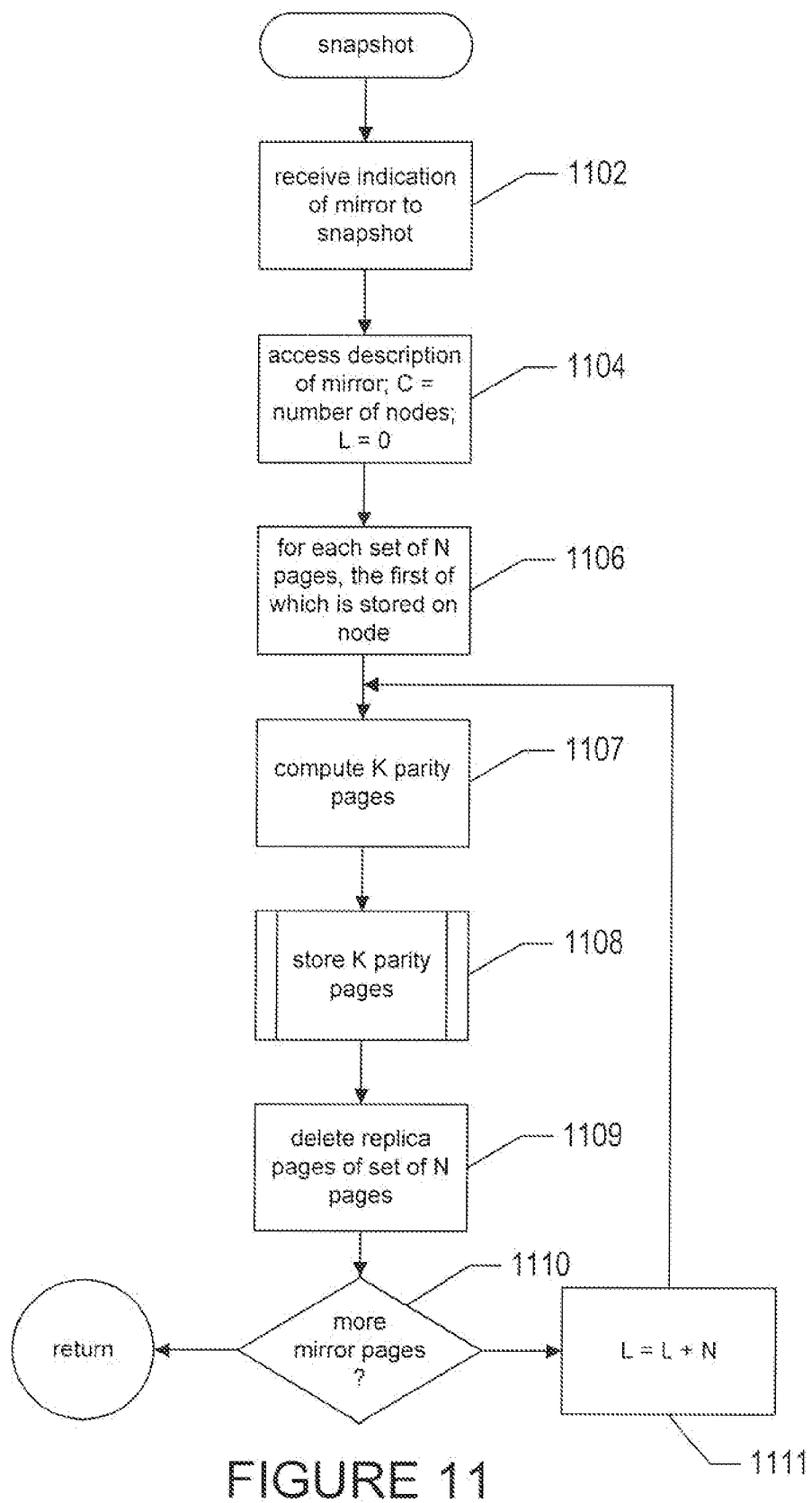
FIGS. 11-12 provide control-flow diagrams that illustrate a snapshot operation that represents one example of the present invention.
Figure 12:
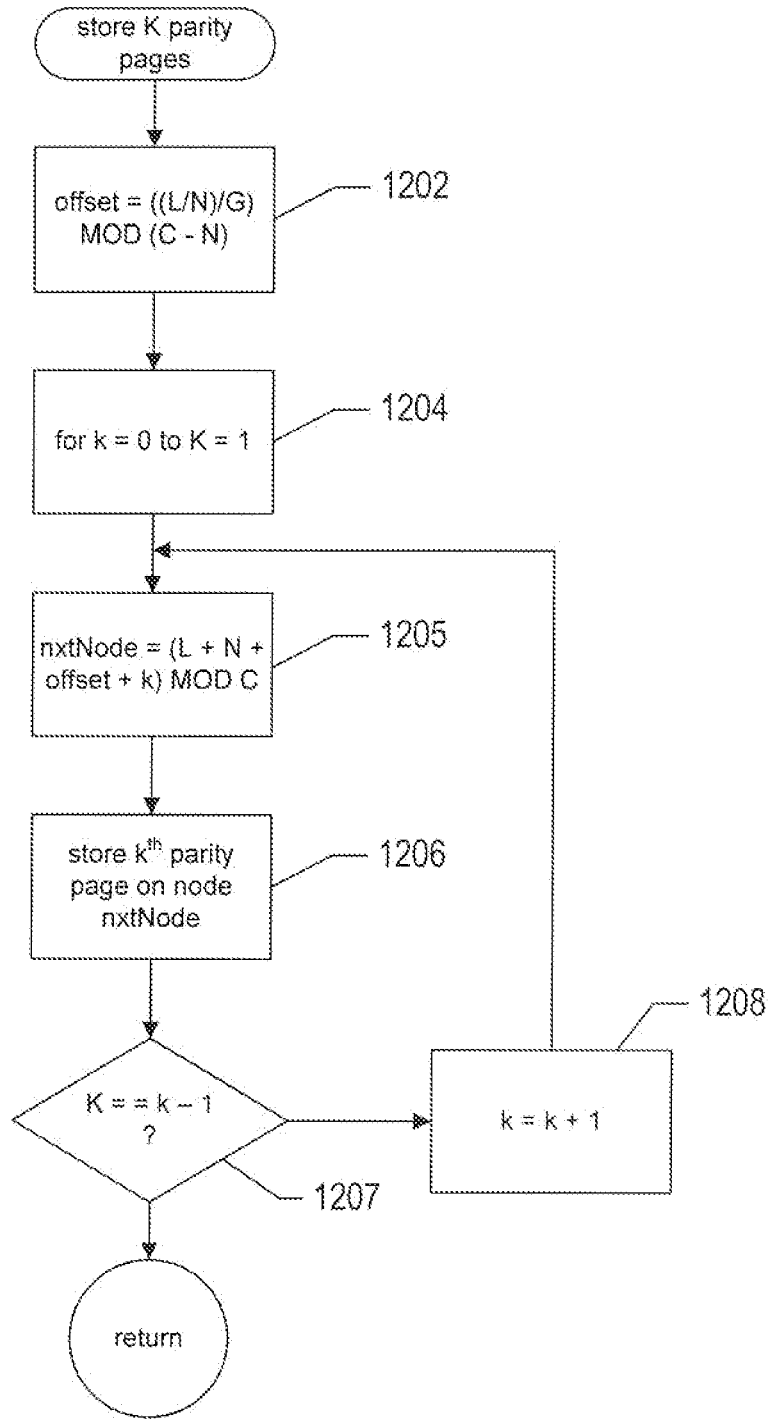

FIGS. 11-12 provide control-flow diagrams that illustrate a snapshot operation that represents one example of the present invention. FIG. 11 illustrates one implementation of a snapshot operation that represents one example of the present invention. In step 1102, an indication of a mirrored data object for which a snapshot operation is to be undertaken is received, using which a description of the mirrored data object is accessed to determine the C nodes across which the data object is mirrored. In addition, various local variables, including the current page number L, are initialized, and a description of the snapshot is created and stored within the multi-node data-storage system. In each iteration of the for-loop of steps 1106-1111, a next stripe of the snapshot is generated and distributed among the C nodes. In step 1107, the K parity pages for the next N data pages are generated, as discussed above. In step 1108, a routine is called to distribute the K parity pages for the current stripe to the C nodes, using the method discussed above with reference to FIG. 10. In step 1110, the replica pages 1, ..., m for the mirrored data object corresponding to the N pages of the currently considered snapshot stripe are deleted. In certain implementations, the $0^{th}$ replica page is copied to a snapshot data page and the $0^{th}$ replica page is then deleted. Alternatively, the $0^{th}$ replica page can be designated as a snapshot data page, in other implementations. When more data pages remain to be snapshot, as determined in step 1110, then the variable L is incremented by N, in step 1111, and a next snapshot stripe is generated and distributed, in a next iteration of the for-loop of steps 1106-1111. Otherwise, the snapshot operation terminates.

FIG. 11 is a somewhat idealized representation of a snapshot operation. In fact, the data pages included within a snapshot may be quite sparse, and therefore, the snapshot operation iterates through only the data pages included in the mirror. Furthermore, the snapshot operation may be distribute among multiple nodes, and may not proceed iteratively. There are many possible snapshot iterations, but the snapshot operation shown in FIG. 11 is a generalized, logical snapshot operation that can be efficiently in many different ways, depending on the characteristics, capabilities, and constraints of the data-storage system.

FIG. 12 illustrates the parity-page distribution routine, called in step 1108 of FIG. 11, that represents one example of the present invention. FIG. 11 illustrates parity-page distribution according to the method described with reference to FIG. 10. In step 1202, an offset for the parity pages of the currently-considered stripe is computed as the remainder of integer division of the minor-cycle number, (L/N)/G, by the number of parity-page node candidates (C−N). Thus, the offset cycles over the values 0, ..., (C−N−1), remaining constant in each minor cycle. Next, in the for-loop of steps 1204-1208, each of the K parity pages in the currently-considered stripe is distributed to a node. The node for the $k^{th}$ parity page is determined, in step 1205, as (L+N+offset+k) MOD C. The $k^{th}$ parity page is stored on that node, in step 1206. When there are more parity pages within the currently-considered stripe to distribute, as determined in step 1207, k is incremented, in step 1208, and a next iteration of the for-loop of steps 1204-1208 is initiated. Otherwise, the parity-page distribution routine terminates.

The distribution of parity pages among the C nodes may be balanced after distribution of a threshold number of stripes, Q, and thereafter when multiples of the threshold number of stripes have been distributed. However, in-between multiples of the threshold number of stripes, the parity pages are generally close to being evenly distributed, particularly once a few threshold multiples of stripes have been distributed.

Although the present invention has been described in terms of particular examples, it is not intended that the invention be limited to these examples. Modifications will be apparent to those skilled in the art. For example, many different implementations of snapshot operations that incorporate parity-page distribution among nodes of a multi-node data-storage system and that represent alternative embodiments of the present invention can be obtained by varying common implementation parameters, including programming language, control structures, modular organization, data structures, underlying operating system, and other implementation parameters. There are alternative methods for distributing parity pages that provide reasonably balanced distributions. As one example, the offset can be calculated as offset=(L/N)/G and the node for the first parity page of a stripe calculated as in step 1205. As a second example, the offset can be calculated as (L/N) MOD (C−N), which produces a balanced distribution for many combinations of C and N.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A multi-node data-storage system comprising:
 a number C of component-data-storage-system nodes that store data pages of a data object in a mirror and in 0, 1, or more parity-encoded snapshots, the mirror comprising 2 or more replicates including a $0^{th}$ replicate and each parity-encoded snapshot containing 1 or more stripes, each stripe including snapshot data pages and snapshot parity pages; and
 a snapshot operation that generates a next parity-encoded snapshot and transfers data pages of the data object from the mirror to the next-generated parity-encoded snapshot, the snapshot operation distributing each snapshot data page to the node that contained a corresponding $0^{th}$-replicate data page, distributing successive snapshot data pages to successive nodes in a cyclic order with respect to the C nodes, and distributing snapshot data and parity pages to the C nodes so that the data and parity pages of each stripe reside on different nodes and so that the data and parity pages are evenly balanced among the C nodes following distribution of a threshold number of snapshot pages, wherein the data pages of an $m^{th}$ replicate of the mirror are distributed among the C nodes according to node numbers n computed for the data pages, the node number n for a data page with sequence number L computed as:

$n=(L \text{ MOD } C)+m.$

2. The multi-node data-storage system of claim 1 wherein the snapshot operation is implemented by computer instructions that execute on one or more nodes of the component-data-storage-system.

3. The multi-node data-storage system of claim 1 wherein each snapshot stripe includes N data pages and K parity pages generated from the N data pages and wherein the snapshot operation distributes data pages of each stripe among N successive nodes, in the cyclic order with respect to the C nodes, of the multi-node data-storage system and distributes the K parity pages among the C–N nodes that do not contain data pages of the stripe, with each parity page of the stripe distributed to a different node than that to which any other parity page of the stripe is distributed.

4. The multi-node data-storage system of claim 1 wherein the MOD operation returns a remainder following integer division.

5. The multi-node data-storage system of claim 3 wherein the snapshot operation computes an offset node for distribution of an initial parity-page of each stripe with respect to the C–N nodes that do not contain data pages of the stripe, and then distributed the parity pages of the stripe in cyclic order among the C–N nodes that do not contain data pages of the stripe, beginning with the first parity page distributed to the offset node.

6. The multi-node data-storage system of claim 5 wherein Q consecutive stripes together comprise a major cycle for stripe distribution, wherein G consecutive stripes together comprise a minor cycle for stripe distribution, and wherein Q and G are computed by:

$GCD(C,N)$=greatest common denominator of $C$ and $N$ $G=C/GCD(C,N)$ $Q=(C-N)*G.$ 7. The multi-node data-storage system of claim 6 wherein the initial parity-page offset for a stripe is computed as:

offset=$((L/N)/G)\text{MOD}(C-N)$ and wherein the node number n to which the $k^{th}$ parity page of a stripe is distributed is computed as:

$n=(L+N+\text{offset}+k)\text{MOD } C$ where L is the sequential page number of the first data page of the stripe.

8. The multi-node data-storage system of claim 5 wherein the initial parity-page offset for a stripe is computed as:

$GCD(C,N)$=greatest common denominator of $C$ and $N$ $G=GCD(C,N)$ offset=$(L/N)/G$ and wherein the node number n to which the $k^{th}$ parity page of a stripe is distributed is computed as:

$n=(L+N+\text{offset}+k)\text{MOD } C$ where L is the sequential page number of the first data page of the stripe.

9. The multi-node data-storage system of claim 8 wherein an offset for each stripe is computed as:

offset=$(L/N)\text{MOD}(C-N)$ and wherein the node number n to which the $k^{th}$ parity page of a stripe is distributed is computed as:

$n=(l+N+\text{offset}+k)\text{MOD } C$ where L is the sequence number of the first data page of the stripe.

10. A mufti-node data-storage system comprising:
a mirror containing a portion of a data object stored across a number C of component-data-storage-system nodes, the mirror comprising 2 or more replicates, including a $0^{th}$ replicate, that each stores a number of data page, the data pages associated with sequence numbers and the data pages of each replicate distributed, according to their sequence numbers, to successive nodes in a cyclic order with respect to the C nodes of the multi-node data-storage system, the distributions of each replicate offset in the cyclic order 1 node; and
at east one snapshot, stored across the number C of component-data-storage-system nodes, containing data pages of the data object formerly stored in the mirror, the snapshot including 1 or more stripes, each stripe including N data pages and K snapshot parity pages, where N+K>=C, wherein each snapshot data page is contained by the node that contained the corresponding $0^{th}$-replicate data page and the snapshot parity pages are distributed among the C nodes so that the data and parity pages of each stripe reside on different nodes and so that the data and parity pages are evenly balanced among the C nodes following distribution of a threshold number of snapshot pages, and wherein the data pages of an $m^{th}$ replicate of the mirror are distributed among the C nodes according to node numbers n computed for the data pages, the node number n for a data page with sequence number L computed as:

$n=(L \text{ MOD } C)+m.$

11. The multi-node data-storage system of claim 10 wherein the MOD operation returns a remainder following integer division.

12. The multi-node data-storage system of claim 10, wherein the snapshot operation computes an offset node for distribution of an initial parity-page of each stripe with respect to the C–N nodes that do not contain data pages of the stripe, and then distributed the parity pages of the stripe in cyclic order among the C–N nodes that do not contain data pages of the stripe, beginning with the first parity page distributed to the offset node.

13. The multi-node data-storage system of claim 12 wherein Q consecutive stripes together comprise a major cycle for stripe distribution, wherein G consecutive stripes together comprise a minor cycle for stripe distribution, and wherein Q and G are computed by:

$GCD(C,N)$=greatest common denominator of $C$ and $N$ $G=C/GCD(C,N)$ $Q=(C-N)*G.$ 14. The multi-node data-storage system of claim 13 wherein the initial parity-page offset for a stripe is computed as:

$$\text{offset} = ((L/N)/G) \text{MOD}(C-N)$$

and wherein the node number n to which the $k^{th}$ parity page of a stripe is distributed is computed as:

$$n = (L+N+\text{offset}+k) \text{MOD } C$$

where L is the sequential page number of the first data page of the stripe.

15. A method for distributing pages of a snapshot of a data object generated from a data-object mirror to a number C of the nodes of a multi-node data-storage system, the method comprising:
- distributing each data page of the snapshot to the node that contained the corresponding data page of one replicate of the mirror; and
- for each stripe within the snapshot, distributing the parity pages of the stripe among the C nodes that do not contain a data page of the stripe, in a cyclic order with respect to the nodes that do not contain a data page of the stripe, beginning at a node corresponding to an offset with respect to the cyclic order of nodes that do not contain a data page of the stripe, wherein the mirror comprises 2 or more replicates including a $0^{th}$ replicate, and wherein the data pages of an $m^{th}$ replicate of the mirror are distributed among the C nodes according to node numbers n computed for the data pages, the node number n for a data page with sequence number L computed as:

$$n = (L \text{ MOD } C) + m.$$

16. The method of claim 15 wherein the mirror comprises 15 or more replicates including the $0^{th}$ replicate.

17. The method of claim 16 wherein the snapshot operation computes an offset node for distribution of an initial parity-page of each stripe with respect to the C−N nodes that do not contain data pages of the stripe, and then distributed the parity pages of the stripe in cyclic order among the C−N nodes that do not contain data pages of the stripe, beginning with the first parity page distributed to the offset node.

18. The method of claim 17 wherein Q consecutive stripes together comprise a major cycle for stripe distribution, wherein G consecutive stripes together comprise a minor cycle for stripe distribution, and wherein Q and G are computed by:

$$\text{GCD}(C,N) = \text{greatest common denominator of } C \text{ and } N$$

$$G = C/\text{GCD}(C,N)$$

$$Q = (C-N)*G.$$

19. The method of claim 18 wherein the initial parity-page offset for a stripe is computed as:

$$\text{offset} = ((L/N)/G) \text{MOD}(C-N)$$

and wherein the node number n to which the $k^{th}$ parity page of a stripe is distributed is computed as:

$$n = (L+N+\text{offset}+k) \text{MOD } C$$

where L is the sequential page number of the first data page of the stripe.

20. The method of claim 15 implemented by computer instructions that execute on one or more nodes of the component-data-storage-system and that are stored in a computer-readable medium.

* * * * *

UNITED STATES PATENT AND TRADEMARK OFFICE
CERTIFICATE OF CORRECTION

PATENT NO. : 8,433,685 B2  Page 1 of 1
APPLICATION NO. : 12/859130
DATED : April 30, 2013
INVENTOR(S) : Mark G. Hayden et al.

It is certified that error appears in the above-identified patent and that said Letters Patent is hereby corrected as shown below:

In the Claims:

In column 15, line 65, in Claim 8, delete "G=GCD(C,N)" and insert -- G=C/GCD(C,N) --, therefor.

In column 16, line 13, in Claim 9, delete "n=(l+N+offset+k)MOD C" and insert -- n=(L+N+offset+k)MOD C --, therefor.

In column 16, line 16, in Claim 10, delete "mufti-node" and insert -- multi-node --, therefor.

In column 16, line 27, in Claim 10, delete "east" and insert -- least --, therefor.

In column 16, line 32, in Claim 10, delete "N+K>=C," and insert -- N+K<=C, --, therefor.

Signed and Sealed this
Eighth Day of October, 2013

Teresa Stanek Rea
*Deputy Director of the United States Patent and Trademark Office*